US012666216B2

(12) United States Patent
Sato et al.

(10) Patent No.: US 12,666,216 B2
(45) Date of Patent: Jun. 23, 2026

(54) INFORMATION PROCESSING DEVICE, INFORMATION PROCESSING METHOD, AND PROGRAM

(71) Applicant: Sony Group Corporation, Tokyo (JP)

(72) Inventors: Tetsuro Sato, Tokyo (JP); Kosei Yamashita, Kanagawa (JP); Hiroyuki Kamata, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 304 days.

(21) Appl. No.: 18/288,107

(22) PCT Filed: Feb. 9, 2022

(86) PCT No.: PCT/JP2022/004997
§ 371 (c)(1),
(2) Date: Oct. 24, 2023

(87) PCT Pub. No.: WO2022/254799
PCT Pub. Date: Dec. 8, 2022

(65) Prior Publication Data
US 2024/0214761 A1 Jun. 27, 2024

(30) Foreign Application Priority Data
Jun. 3, 2021 (JP) ................................ 2021-093484

(51) Int. Cl.
*H04S 7/00* (2006.01)
*G01S 1/74* (2006.01)
(Continued)

(52) U.S. Cl.
CPC ............... *H04S 7/303* (2013.01); *H04R 1/08* (2013.01)

(58) Field of Classification Search
None
See application file for complete search history.

(56) References Cited

U.S. PATENT DOCUMENTS

2005/0249360 A1* 11/2005 Adcock ................. H04R 3/005 381/92
2017/0278519 A1 9/2017 Visser et al.
(Continued)

FOREIGN PATENT DOCUMENTS

CN 110988799 A 4/2020
CN 112379331 A 2/2021
(Continued)

*Primary Examiner* — Qin Zhu
(74) *Attorney, Agent, or Firm* — Paratus Law Group, PLLC

(57) ABSTRACT

There is provided an information processing device, an information processing method, and a program that enable a system including two speakers and one microphone to measure a position of the microphone. An audio reception block receives an audio signal including a spreading code signal obtained by performing spread spectrum modulation on a spreading code, the audio signal being output from two audio output blocks existing at a known positions, and calculates a position of an audio reception unit on the basis of an arrival time difference distance that is a difference between distances to the two audio output blocks based on an arrival time at which a peak of cross-correlation is detected. The present invention can be applied to a game controller or an HMD.

17 Claims, 28 Drawing Sheets

(51) Int. Cl.

| | |
|---|---|
| ***G01S 5/18*** | (2006.01) |
| ***G01S 5/26*** | (2006.01) |
| ***H04R 1/08*** | (2006.01) |

(56) References Cited

U.S. PATENT DOCUMENTS

| | | | | |
|---|---|---|---|---|
| 2019/0302222 | A1* | 10/2019 | Bradley .................... | G01S 5/18 |
| 2020/0202884 | A1 | 6/2020 | Phan Le | |

FOREIGN PATENT DOCUMENTS

| | | | |
|---|---|---|---|
| EP | 2708912 | A1 | 3/2014 |
| JP | 2001-337157 | A | 12/2001 |
| JP | 2013-195405 | A | 9/2013 |
| JP | 2014-220741 | A | 11/2014 |
| WO | WO 2021/039606 | A1 | 3/2021 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2022/004997 (filed on Feb. 9, 2022) under 35 U.S.C. § 371, which claims priority to Japanese Patent Application No. 2021-093484 (filed on Jun. 3, 2021), which are all hereby incorporated by reference in their entirety.

TECHNICAL FIELD

The present disclosure relates to an information processing device, and an information processing method, and a program, and more particularly, to an information processing device, and an information processing method, and a program that enable positioning of a microphone using a stereo speaker and a microphone.

BACKGROUND ART

A technology has been proposed in which a transmission device modulates a data code with a code sequence to generate a modulation signal and emits the modulation signal as sound, and a reception device receives the emitted sound, correlates the modulation signal that is the received audio signal with the code sequence, and measures a distance to the transmission device on the basis of a peak of correlation (see Patent Document 1).

CITATION LIST

Patent Document

PATENT DOCUMENT 1: Japanese Patent Application Laid-Open No. 2014-220741

SUMMARY OF THE INVENTION

Problems to be Solved by the Invention

However, in the case of using the technology described in Patent Document 1, the reception device can measure the distance to the transmission device, but in order to obtain the two-dimensional position of the reception device, in a case where the reception device and the transmission device are not synchronized in time, it is necessary to use at least three transmission devices.

That is, in a general audio system including a stereo speaker (transmission device) including two speakers and a microphone (reception device), the two-dimensional position of the microphone cannot be obtained.

The present disclosure has been made in view of such a situation, and particularly, an object of the present disclosure is to enable measurement of a two-dimensional position of a microphone in an audio system including a stereo speaker and the microphone.

Solutions to Problems

An information processing device and a program according to one aspect of the present disclosure are an information processing device and a program including: an audio reception unit that receives an audio signal including a spreading code signal obtained by performing spread spectrum modulation on a spreading code, the audio signal being output from two audio output blocks existing at known positions, and a position calculation unit that calculates a position of the audio reception unit on the basis of an arrival time difference distance that is a difference between distances identified from an arrival time that is a time until the audio signals of the two audio output blocks arrive at the audio reception unit and are received.

An information processing method according to one aspect of the present disclosure is an information processing method of an information processing device including an audio reception unit that receives an audio signal including a spreading code signal obtained by performing spread spectrum modulation on a spreading code, the audio signal being output from two audio output blocks existing at known positions, the method including a step of calculating a position of the audio reception unit on the basis of an arrival time difference distance that is a difference between distances identified from an arrival time that is a time until the audio signals of the two audio output blocks arrive at the audio reception unit and are received.

In one aspect of the present disclosure, an audio signal including a spreading code signal obtained by performing spread spectrum modulation on a spreading code is received by an audio reception unit, the audio signal being output from two audio output blocks existing at known positions, and a position of the audio reception unit is calculated on the basis of an arrival time difference distance that is a difference between distances identified from an arrival time that is a time until the audio signals of the two audio output blocks arrive at the audio reception unit and are received.

MODE FOR CARRYING OUT THE INVENTION

Figure 1:
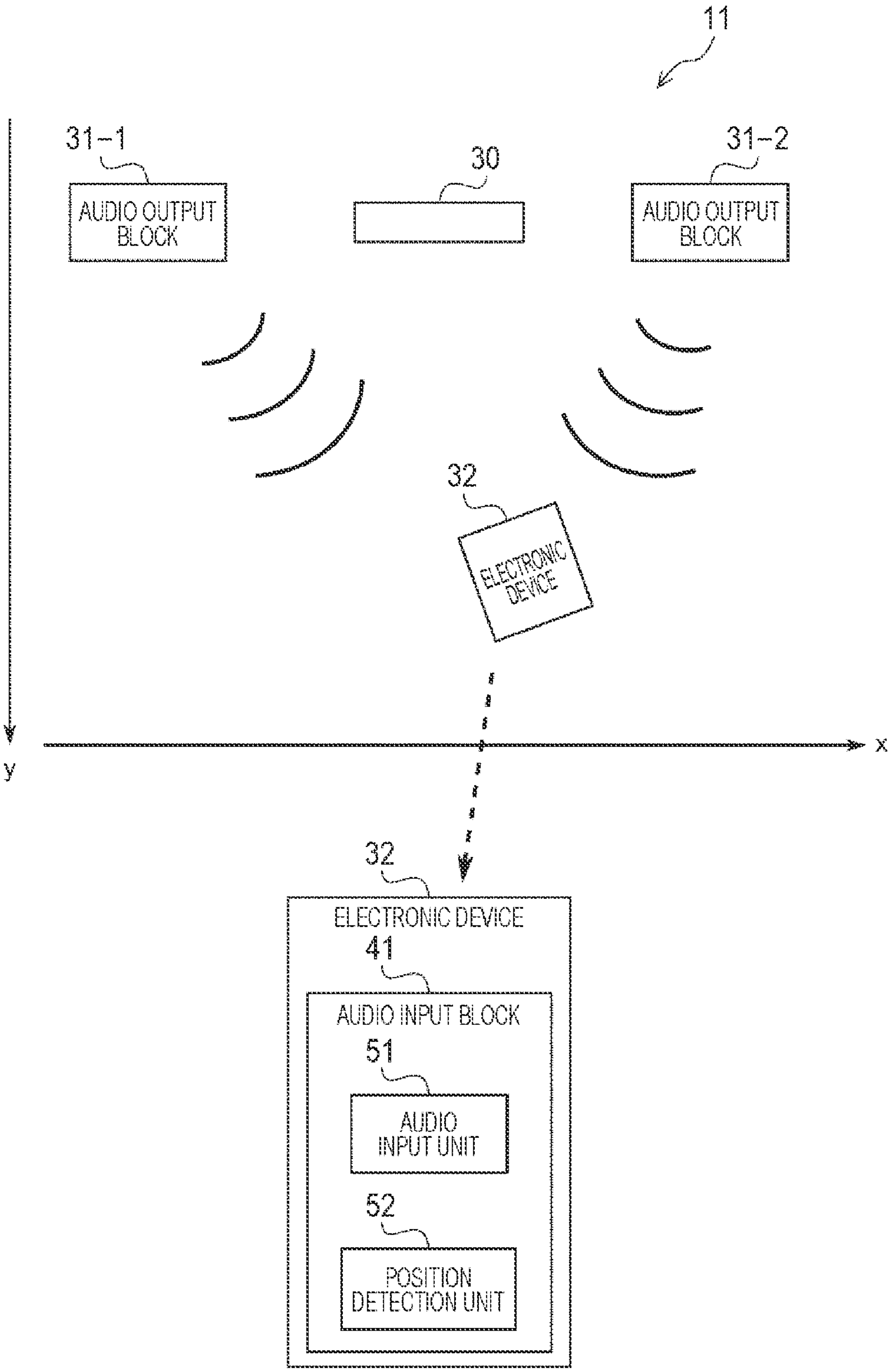
FIG. 1 is a diagram illustrating a configuration example of a home audio system of the present disclosure.

Hereinafter, preferred embodiments of the present disclosure will be described in detail with reference to the accompanying drawings. Note that in the present specification and drawings, components having substantially the same functional configuration are denoted using the same reference numerals. Redundant explanations are therefore omitted.

Hereinafter, modes for carrying out the present technology will be described. The description is given in the following order.

1. First Embodiment
2. Application example of first embodiment
3. Second Embodiment
4. Third Embodiment
5. Application example of third embodiment
6. Example of execution by software

1. First Embodiment

<Configuration of Home Audio System>

In particular, the present disclosure enables an audio system including a stereo speaker including two speakers and a microphone to measure a position of the microphone.

FIG. 1 illustrates a configuration example of a home audio system to which the present disclosure is applied.

A home audio system 11 in FIG. 1 includes a display device 30 such as a television (TV), audio output blocks 31-1 and 31-2, and an electronic device 32. Note that, hereinafter, in a case where it is not necessary to particularly distinguish the audio output blocks 31-1 and 31-2 from each other, they are simply referred to as the audio output block 31, and other configurations are also referred to in a same manner. Furthermore, the display device 30 is also simply referred to as a TV 30.

Each of the audio output blocks 31-1 and 31-2 includes a speaker, and emits sound by including, in sound such as a music content and a game, sound including a modulated signal obtained by spectrally diffusing and modulating a data code for identifying the position of the electronic device 32 with a spreading code.

The electronic device 32 is carried by or worn by the user, and is, for example, a smartphone or a head mounted display (HMD) used as a game controller.

The electronic device 32 includes an audio input block 41 including an audio input unit 51 such as a microphone that receives sound emitted from the audio output blocks 31-1 and 31-2, and a position detection unit 52 that detects its own position with respect to the audio output blocks 31-1 and 31-2.

The audio input block 41 recognizes in advance the positions of the display device 30 and the audio output blocks 31-1 and 31-2 in the space as known position information, causes the audio input unit 51 to collect sound emitted from the audio output block 31, and causes the position detection unit 52 to obtain the distances to the audio output blocks 31-1 and 31-2 on the basis of a modulation signal included in the collected sound to detect the two-dimensional position (x, y) of the position detection unit 52 with respect to the audio output blocks 31-1 and 31-2.

As a result, since the position of the electronic device 32 with respect to the audio output blocks 31-1 and 31-2 is identified, sound output from the audio output blocks 31-1 and 31-2 can be output after correcting the sound field localization according to the identified position. Hence, the user can listen to sound with a realistic feeling according to the movement of the user.

Configuration Example of Audio Output Block

Figure 2:
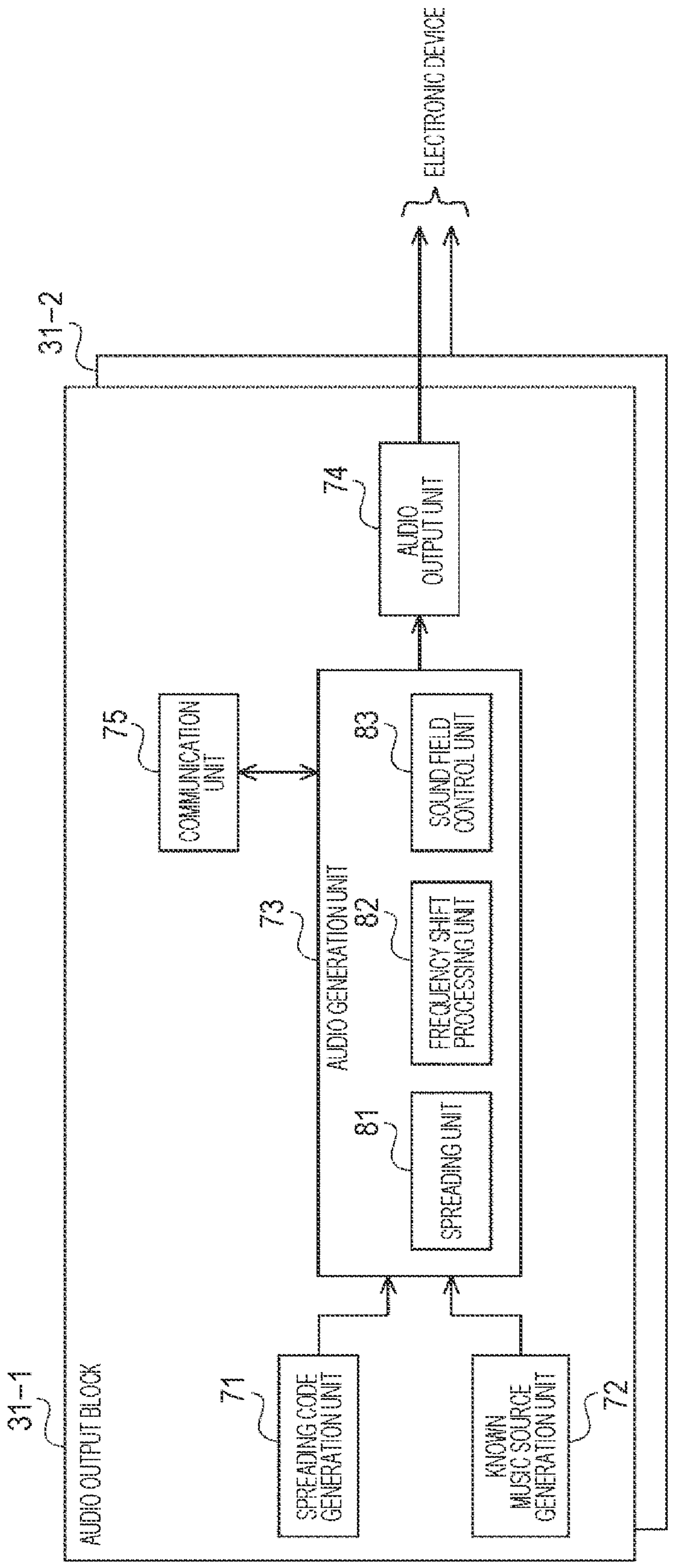
FIG. 2 is a diagram illustrating a configuration example of an audio output block in FIG. 1.

Next, a configuration example of the audio output block 31 will be described with reference to FIG. 2.

The audio output block 31 includes a spreading code generation unit 71, a known music source generation unit 72, an audio generation unit 73, an audio output unit 74, and a communication unit 75.

The spreading code generation unit 71 generates a spreading code and outputs the spreading code to the audio generation unit 73.

The known music source generation unit 72 stores known music, generates a known music source on the basis of the stored known music, and outputs the known music source to the audio generation unit 73.

The audio generation unit 73 applies spread spectrum modulation using a spreading code to the known music source to generate sound including a spread spectrum signal, and outputs the sound to the audio output unit 74.

More specifically, the audio generation unit 73 includes a spreading unit 81, a frequency shift processing unit 82, and a sound field control unit 83.

The spreading unit 81 applies spread spectrum modulation using a spreading code to the known music source to generate a spread spectrum signal.

The frequency shift processing unit 82 shifts the frequency of the spreading code in the spread spectrum signal to a frequency band that is difficult for human ears to hear.

On the basis of information on the position of the electronic device 32 supplied from the electronic device 32, the sound field control unit 83 reproduces the sound field according to the positional relationship between the electronic device 32 and the sound field control unit 83.

The audio output unit 74 is, for example, a speaker, and outputs the known music source supplied from the audio generation unit 73 and sound based on the spread spectrum signal.

The communication unit 75 communicates with the electronic device 32 by wireless communication represented by Bluetooth (registered trademark) or the like to exchange various data and commands.

Configuration Example of Electronic Device

Next, a configuration example of the electronic device 32 will be described with reference to FIG. 3.

The electronic device 32 includes the audio input block 41, a control unit 42, an output unit 43, and a communication unit 44.

The audio input block 41 receives input of sound emitted from the audio output blocks 31-1 and 31-2, obtains arrival times and peak power on the basis of a correlation between the received sound, a spread spectrum signal, and a spreading code, obtains a two-dimensional position (x, y) of the audio input block 41 on the basis of an arrival time difference distance based on the obtained arrival times and a peak power ratio that is a ratio of the peak power of each of the audio output blocks 31-1 and 31-2, and outputs the two-dimensional position (x, y) to the control unit 42.

On the basis of the position of the electronic device 32 supplied from the audio input block 41, for example, the control unit 42 controls the communication unit 44 to acquire information notification of which is provided from the audio output blocks 31-1 and 31-2, and then presents the information to the user by the output unit 43 including a display, a speaker, and the like. Furthermore, the control unit 42 controls the communication unit 44 to transmit a command for setting a sound field based on the two-dimensional position of the electronic device 32 to the audio output blocks 31-1 and 31-2.

The communication unit 44 communicates with the audio output block 31 by wireless communication represented by Bluetooth (registered trademark) or the like to exchange various data and commands.

More specifically, the audio input block 41 includes the audio input unit 51 and the position detection unit 52.

The audio input unit 51 is, for example, a microphone, and collects sound emitted from the audio output blocks 31-1 and 31-2 and outputs the sound to the position detection unit 52.

The position detection unit 52 obtains the position of the electronic device 32 on the basis of the sound collected by the audio input unit 51 and emitted from the audio output blocks 31-1 and 31-2.

The position detection unit 52 includes a known music source removal unit 91, a spatial transmission characteristic calculation unit 92, an arrival time calculation unit 93, a peak power detection unit 94, and a position calculation unit 95.

The spatial transmission characteristic calculation unit 92 calculates the spatial transmission characteristic on the basis of information on the sound supplied from the audio input unit 51, the characteristic of the microphone forming the audio input unit 51, and the characteristic of the speaker forming the audio output unit 74 of the audio output block 31, and outputs the spatial transmission characteristic to the known music source removal unit 91.

The known music source removal unit 91 stores a music source stored in advance in the known music source generation unit 72 in the audio output block 31 as a known music source.

Then, the known music source removal unit 91 removes the component of the known music source from the sound supplied from the audio input unit 51 in consideration of the spatial transmission characteristic supplied from the spatial transmission characteristic calculation unit 92, and outputs the result to the arrival time calculation unit 93 and the peak power detection unit 94.

That is, the known music source removal unit 91 removes the component of the known music source from the sound collected by the audio input unit 51, and outputs only the spread spectrum signal component to the arrival time calculation unit 93 and the peak power detection unit 94.

The arrival time calculation unit 93 calculates the arrival time from when sound is emitted from each of the audio output blocks 31-1 and 31-2 to when the sound is collected on the basis of a spread spectrum signal component included in the sound collected by the audio input unit 51, and outputs the arrival time to the peak power detection unit 94 and the position calculation unit 95.

Note that the method of calculating the arrival time will be described later in detail.

The peak power detection unit 94 detects the power of the spread spectrum signal component at the peak detected by the arrival time calculation unit 93 and outputs the power to the position calculation unit 95.

The position calculation unit 95 obtains the arrival time difference distance and the peak power ratio on the basis of the arrival time of each of the audio output blocks 31-1 and 31-2 supplied from the arrival time calculation unit 93 and the peak power supplied from the peak power detection unit 94, and obtains the position (two-dimensional position) of the electronic device 32 on the basis of the obtained arrival time difference distance and peak power ratio and outputs the position to the control unit 42.

Note that a detailed configuration of the position calculation unit 95 will be described later in detail with reference to FIG. 4.

Configuration Example of Position Calculation Unit

Next, a configuration example of the position calculation unit 95 will be described with reference to FIG. 4.

The position calculation unit 95 includes an arrival time difference distance calculation unit 111, a peak power ratio calculation unit 112, and a position calculator 113.

The arrival time difference distance calculation unit 111 calculates, as an arrival time difference distance, a difference in distance to each of the audio output blocks 31-1 and 31-2 obtained on the basis of the arrival time of each of the audio output blocks 31-1 and 31-2, and outputs the arrival time difference distance to the position calculator 113.

The peak power ratio calculation unit 112 obtains, as a peak power ratio, a ratio of peak powers of sound emitted from the audio output blocks 31-1 and 31-2, and outputs the peak power ratio to the position calculator 113.

On the basis of the arrival time difference distance of the audio output blocks 31-1 and 31-2 supplied from the arrival time difference distance calculation unit 111 and the peak power ratio of the audio output blocks 31-1 and 31-2 supplied from the peak power ratio calculation unit 112, the position calculator 113 calculates the position of the electronic device 32 with respect to the audio output blocks 31-1 and 31-2 by machine learning using a neural network, and outputs the position to the control unit 42.

<Principle of Communication Using Spreading Code>

Next, the principle of communication using spreading codes will be described with reference to FIG. 5.

Figure 5:
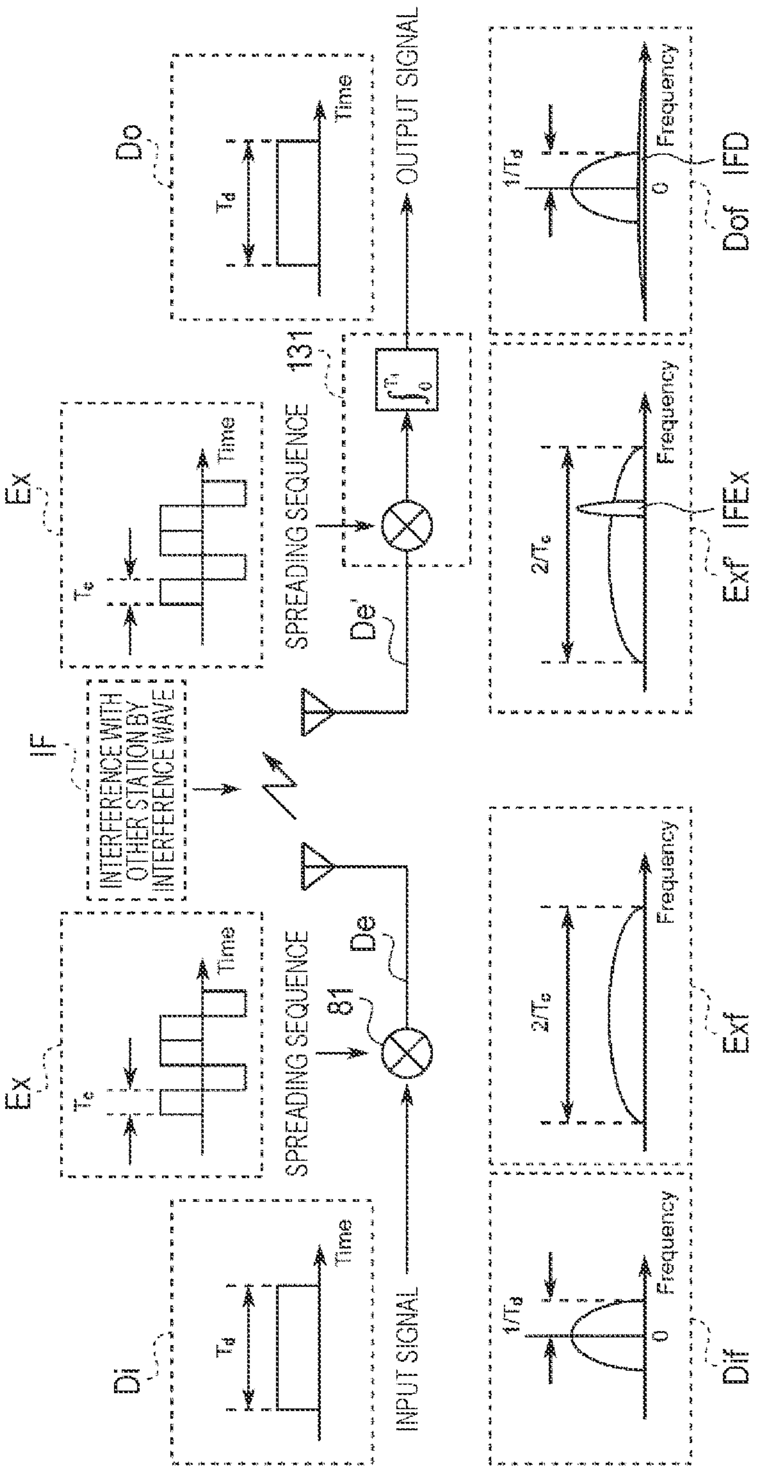
FIG. 5 is a diagram illustrating communication using a spreading code.

On the transmission side in the left part of FIG. 5, the spreading unit 81 performs spread spectrum modulation by multiplying an input signal Di having a pulse width Td to be transmitted by a spreading code Ex, thereby generating a transmission signal De having a pulse width Tc and transmitting the transmission signal De to the reception side in the right part of FIG. 5.

At this time, in a case where a frequency band Dif of the input signal Di is indicated by, for example, frequency bands −1/Td to 1/Td, a frequency band Exf of the transmission signal De is widened by being multiplied by the spreading code Ex to be in frequency bands −1/Tc to 1/Tc (1/Tc>1/Td), whereby the energy is spread on the frequency axis.

Note that FIG. 5 illustrates an example in which the transmission signal De is interfered by an interfering wave IF.

On the reception side, the transmission signal De having been interfered by the interfering wave IF is received as a reception signal De'.

The arrival time calculation unit 93 restores a reception signal Do by applying despreading to the reception signal De' using the same spreading code Ex.

At this time, a frequency band Exf' of the reception signal De' includes a component IFEx of the interfering wave, but in a frequency band Dof of the despread reception signal Do, energy is spread by restoring the component IFEx of the interfering wave as the spread frequency band IFD, so that the influence of the interfering wave IF on the reception signal Do can be reduced.

That is, as described above, in communication using the spreading code, it is possible to reduce the influence of the interfering wave IF generated on the transmission path of the transmission signal De, and it is possible to improve noise resistance.

Figure 6:
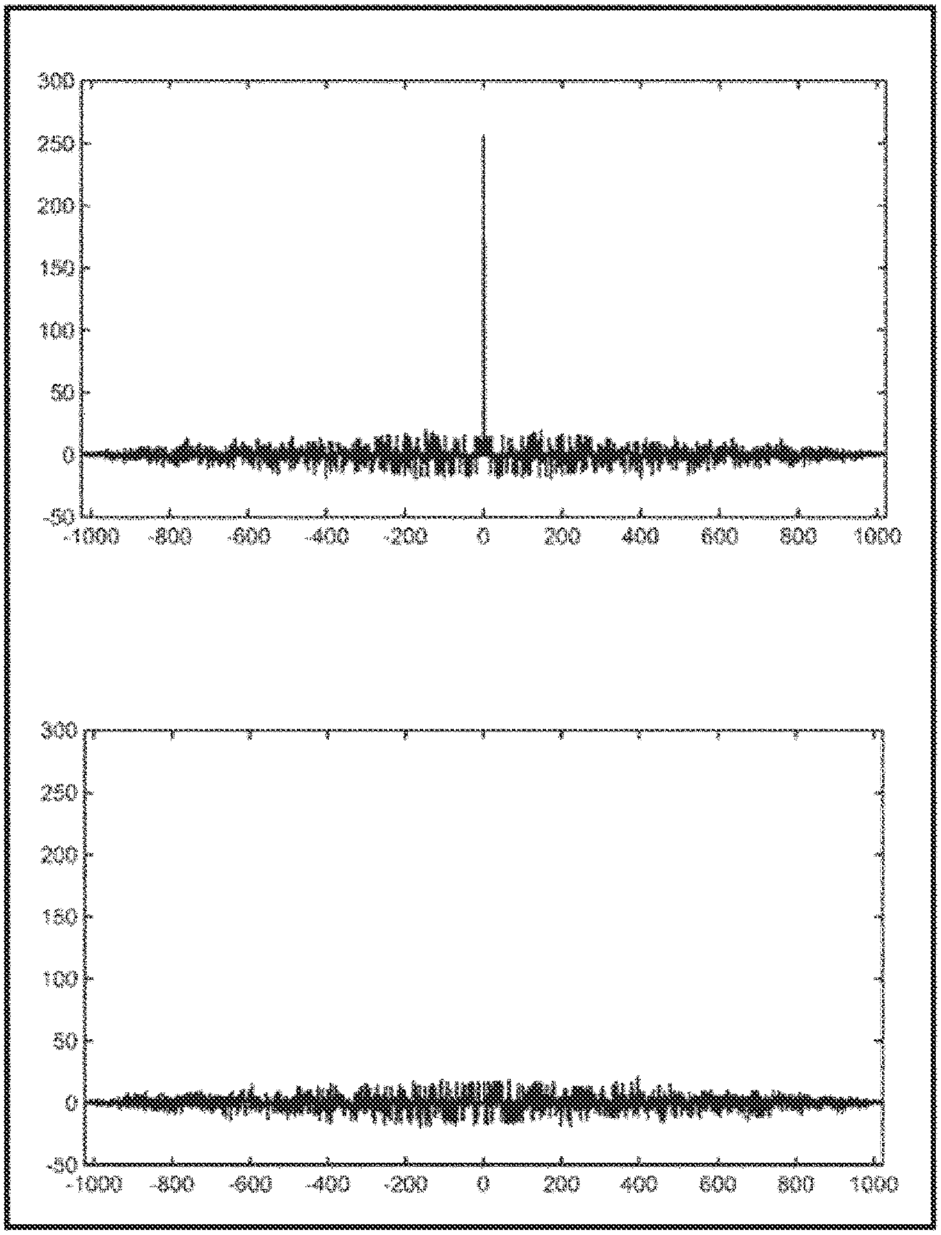
FIG. 6 is a diagram illustrating autocorrelation and cross-correlation of a spreading code.

Furthermore, in the spreading code, for example, autocorrelation is in the form of an impulse as illustrated in the waveform diagram in the upper part of FIG. 6, and cross-correlation is 0 as illustrated in the waveform in the lower part of FIG. 6. Note that FIG. 6 illustrates a change in the correlation value in a case where a Gold sequence is used as the spreading code, where the horizontal axis represents the coding sequence and the vertical axis represents the correlation value.

That is, by setting a spreading code with high randomness to each of the audio output blocks 31-1 and 31-2, in the audio input block 41, the spectrum signal included in the sound can be appropriately distinguished and recognized for each of the audio output blocks 31-1 and 31-2.

The spreading code may be not only a Gold sequence but also an M sequence, pseudorandom noise (PN), or the like.

<Method for Calculating Arrival Time by Arrival Time Calculation Unit>

The timing at which the peak of the observed cross-correlation is observed in the audio input block 41 is the timing at which the sound emitted by the audio output block 31 is collected in the audio input block 41, and thus differs depending on the distance between the audio input block 41 and the audio output block 31.

Figure 7:
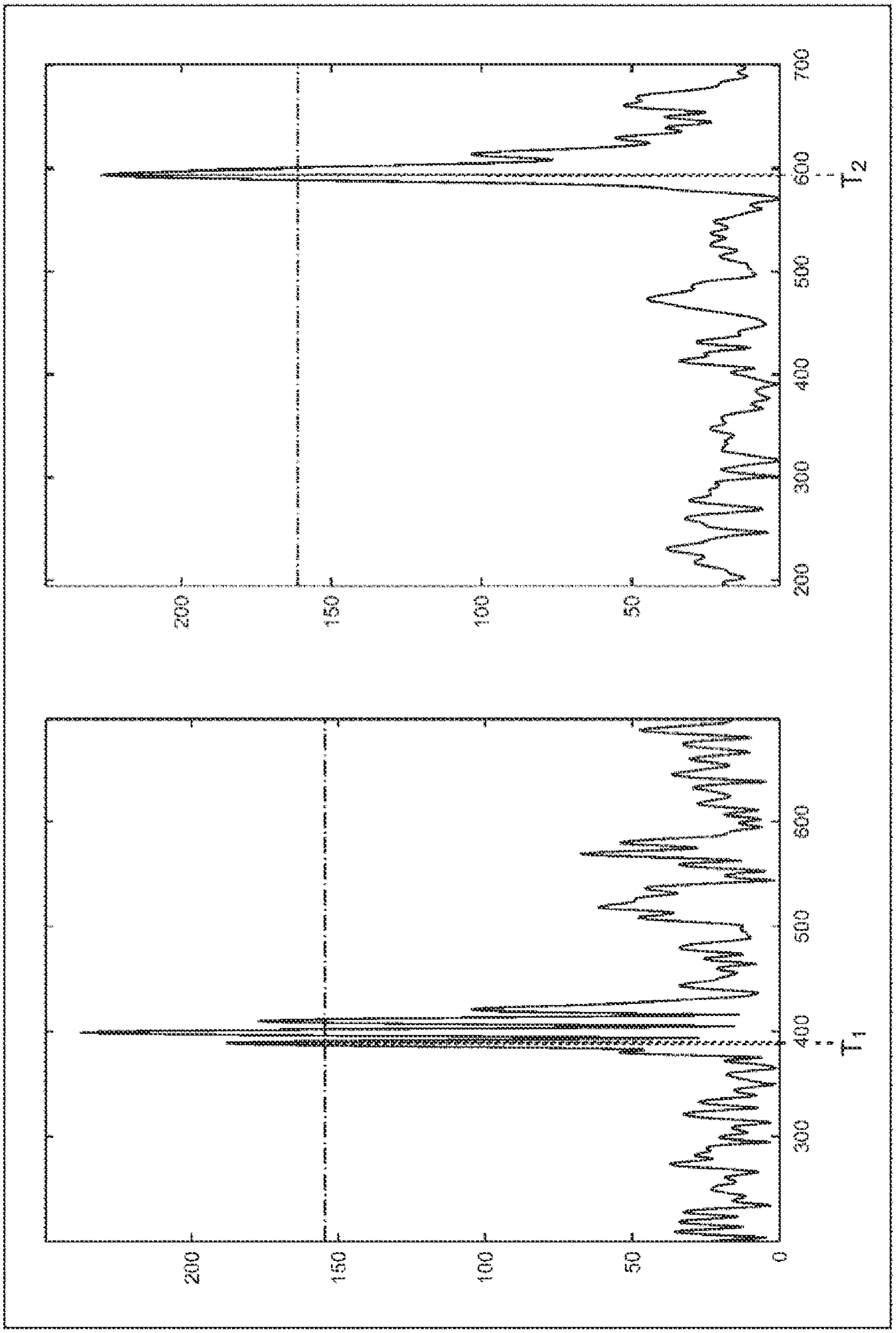
FIG. 7 is a diagram illustrating an arrival time of a spreading code using cross-correlation.

That is, for example, when the distance between the audio input block 41 and the audio output block 31 is a first distance and a peak is detected at time T1 as illustrated in the left part of FIG. 7, when the distance between the audio input block 41 and the audio output block 31 is a second distance in which the first distance is far, the peak is observed at time T2 (>T1) as illustrated in the right part of FIG. 7.

Note that in FIG. 7, the horizontal axis represents the elapsed time from when sound is output from the audio output block 31, and the vertical axis represents the strength of cross-correlation.

That is, the distance between the audio input block 41 and the audio output block 31 can be obtained by multiplying the time from when sound is emitted from the audio output block 31 to when a peak is observed in the cross-correlation, that is, the arrival time from when sound emitted from the audio output block 31 is collected in the audio input block 41 by the sound velocity.

Configuration Example of Arrival Time Calculation Unit

Figure 8:
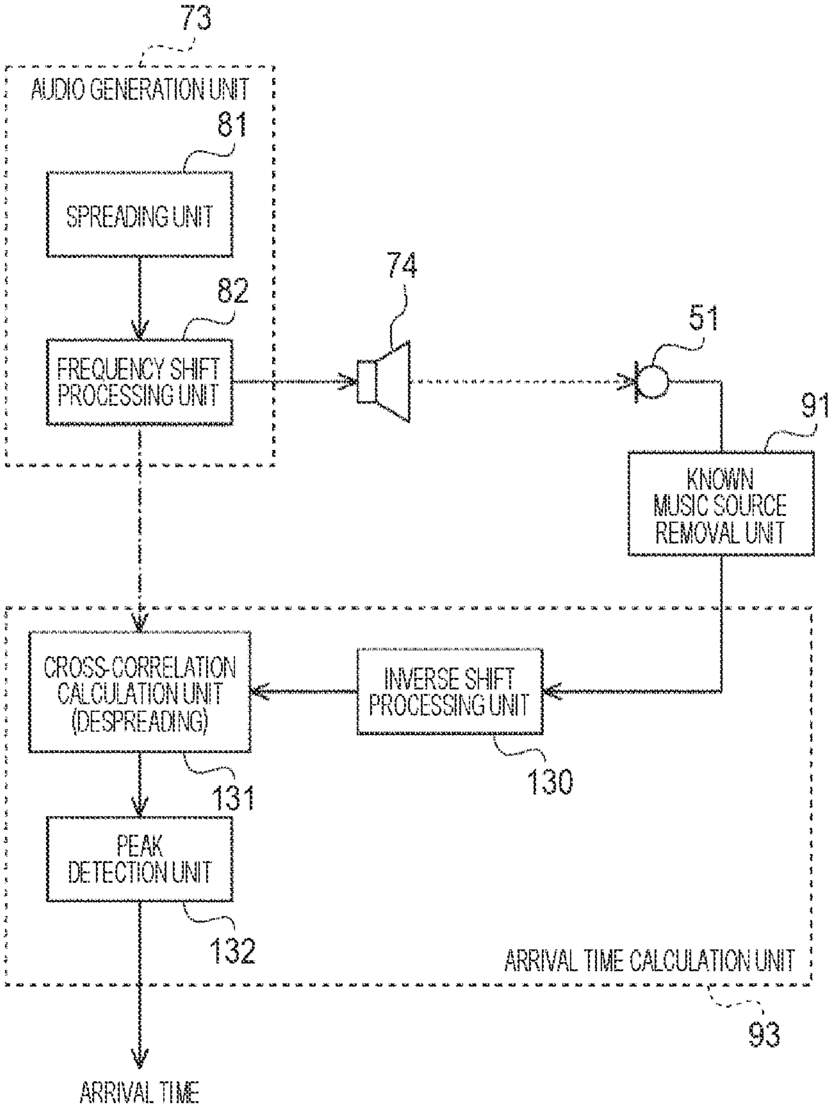
FIG. 8 is a diagram illustrating a configuration example of an arrival time calculation unit.

Next, a configuration example of the arrival time calculation unit 93 will be described with reference to FIG. 8.

The arrival time calculation unit 93 includes an inverse shift processing unit 130, a cross-correlation calculation unit 131, and a peak detection unit 132.

The inverse shift processing unit 130 restores, to the original frequency band by downsampling, a spreading code signal subjected to the spread spectrum modulation, which has been frequency-shifted by upsampling in the frequency shift processing unit 82 of the audio output block 31, in an audio signal collected by the audio input unit 51, and outputs the restored signal to the cross-correlation calculation unit 131.

Note that shifting of the frequency band by the frequency shift processing unit 82 and restoring of the frequency band by the inverse shift processing unit 130 will be described later in detail with reference to FIG. 10.

The cross-correlation calculation unit 131 calculates cross-correlation between the spreading code and the reception signal from which the known music source in the audio signal collected by the audio input unit 51 of the audio input block 41 has been removed, and outputs the cross-correlation to the peak detection unit 132.

The peak detection unit 132 detects a peak time in the cross-correlation calculated by the cross-correlation calculation unit 131 and outputs the peak time as an arrival time.

Here, since it is generally known that the calculation amount for the calculation of the cross-correlation performed in the cross-correlation calculation unit 131 is very large, the calculation is achieved by equivalent calculation with a small calculation amount.

Specifically, the cross-correlation calculation unit 131 performs Fourier transform on each of the transmission signal output by the audio output unit 74 of the audio output block 31 and the reception signal from which the known music source in the audio signal received by the audio input unit 51 of the audio input block 41 has been removed, as indicated by the following formulae (1) and (2).

[Math. 1]

$$G(f) = \int_{-\infty}^{\infty} g\left(\frac{V-v}{V}t\right) \exp\,(-i2\pi ft)dt \tag{1}$$

-continued

[Math. 2]

$$H(f)=\int_{-\infty}^{\infty}h(t)\exp(-i2\pi ft)dt \quad (2)$$

Here, g is a reception signal obtained by removing the known music source in the audio signal received by the audio input unit 51 of the audio input block 41, and G is a result of Fourier transform of the reception signal g obtained by removing the known music source in the audio signal received by the audio input unit 51 of the audio input block 41.

Furthermore, h represents a transmission signal to be output by the audio output unit 74 of the audio output block 31, and H represents a result of Fourier transform of the transmission signal to be output by the audio output unit 74 of the audio output block 31.

Moreover, V represents the sound velocity, v represents the velocity of (audio input unit 51 of) the electronic device 32, t represents time, and f represents frequency.

Next, the cross-correlation calculation unit 131 obtains a cross spectrum by multiplying the results G and H of the Fourier transform by each other as expressed by the following formula (3).

[Math. 3]

$$P(f)=G(f)H(f) \quad (3)$$

Here, P represents a cross spectrum obtained by multiplying the results G and H of the Fourier transform by each other.

Then, as expressed by the following formula (4), the cross-correlation calculation unit 131 performs inverse Fourier transform on the cross spectrum P to obtain cross-correlation between the transmission signal h output by the audio output unit 74 of the audio output block 31 and the reception signal g from which the known music source in the audio signal received by the audio input unit 51 of the audio input block 41 has been removed.

[Math. 4]

$$P(t)=\int_{-\infty}^{\infty}P(t)\exp(-i2\pi ft)df \quad (4)$$

Here, p represents a cross-correlation between the transmission signal h output by the audio output unit 74 of the audio output block 31 and the reception signal g from which the known music source in the audio signal received by the audio input unit 51 of the audio input block 41 has been removed.

Then, the peak detection unit 132 detects a peak of the cross-correlation p, detects an arrival time T on the basis of the detected peak of the cross-correlation p, and outputs the arrival time T to the position calculation unit 95. The arrival time difference distance calculation unit 111 of the position calculation unit 95 calculates the distance between the audio input block 41 and the audio output block 31 by calculating the following formula (5) on the basis of the detected peak of the cross-correlation p.

[Math. 5]

$$D=T\times V \quad (5)$$

Here, D represents a distance (arrival time distance) between (audio input unit 51 of) the audio input block 41 and (audio output unit 74 of) the audio output block 31, T represents the arrival time, and V represents the sound velocity. Furthermore, the sound velocity V is, for example, 331.5+0.6×Q (m/s) (Q is temperature ° C.).

Then, the arrival time difference distance calculation unit 111 calculates a difference between the distances of the audio input block 41 and the audio output blocks 31-1 and 31-2 obtained as described above as an arrival time difference distance, and outputs the arrival time difference distance to the position calculator 113.

The peak power detection unit 94 detects, as peak power, power of each of sounds collected at a timing at which the cross-correlation p between the audio input block 41 and the audio output blocks 31-1 and 31-2 detected by the peak detection unit 132 of the arrival time calculation unit 93 peaks, and outputs the peak power to the peak power ratio calculation unit 112 of the position calculation unit 95.

The peak power ratio calculation unit 112 obtains a ratio of the peak power supplied from the peak power detection unit 94 and outputs the ratio to the position calculator 113.

Note that the cross-correlation calculation unit 131 may further obtain the velocity v of (audio input unit 51 of) the electronic device 32 by obtaining the cross-correlation p.

More specifically, the cross-correlation calculation unit 131 obtains the cross-correlation p while changing the velocity v in a predetermined range (e.g., −1.00 m/s to 1.00 m/s) in a predetermined step (e.g., 0.01 m/s step), and obtains the velocity v indicating the maximum peak of the cross-correlation p as the velocity v of (audio input unit 51 of) the electronic device 32.

It is also possible to obtain the absolute speed of (audio input block 41 of) the electronic device 32 on the basis of the velocity v obtained for each of the audio output blocks 31-1 to 31-4.

<Frequency Shift>

The frequency band of the spreading code signal is a frequency that is a Nyquist frequency Fs that is a half of the sampling frequency. For example, in a case where the Nyquist frequency Fs is 8 kHz, the frequency band is set to 0 kHz to 8 kHz that is a frequency band lower than the Nyquist frequency Fs.

Figure 9:
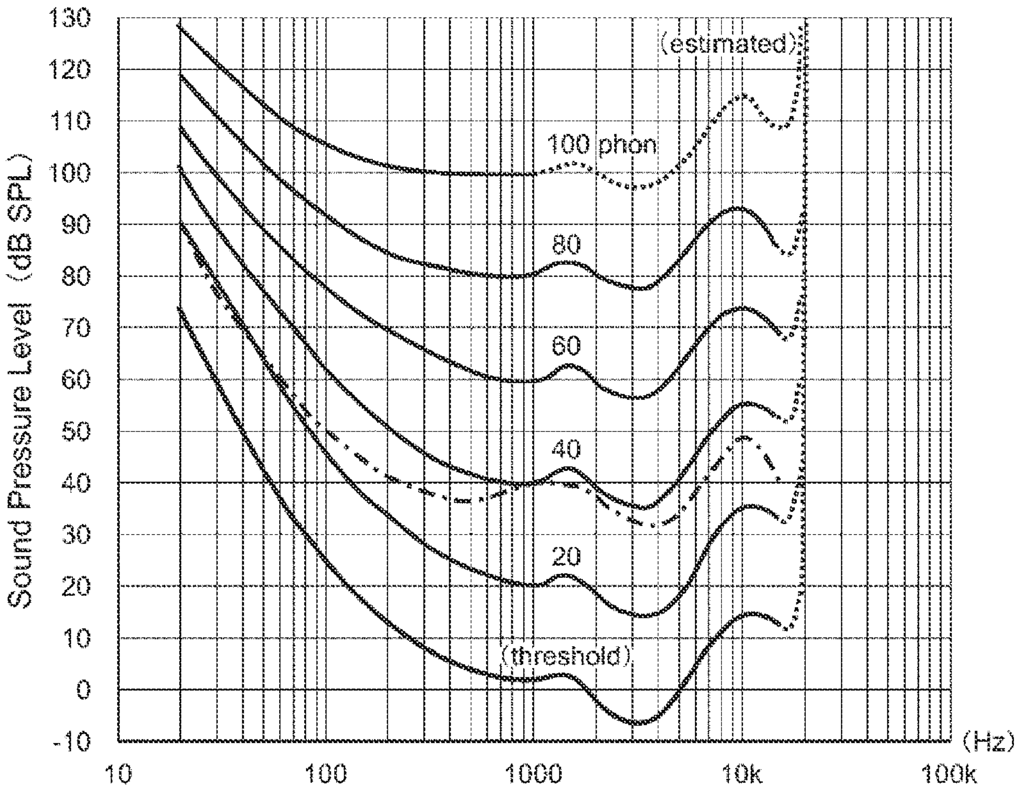
FIG. 9 is a diagram illustrating human hearing.

Incidentally, as illustrated in FIG. 9, it is known that human hearing has high sensitivity to sound in a frequency band around 3 kHz regardless of the level of loudness, decreases from around 10 kHz, and can hardly hear when exceeding 20 kHz.

FIG. 9 illustrates a change in the sound pressure level for each frequency at each of loudness levels 0, 20, 40, 60, 80, and 100 phon, where the horizontal axis represents the frequency and the vertical axis represents the sound pressure level. Note that the thick alternate long and short dash line indicates the sound pressure level of the microphone, and indicates that the sound pressure level is constant regardless of the loudness level.

Therefore, in a case where the frequency band of the spread spectrum signal is 0 kHz to 8 kHz, when the sound of the spreading code signal is emitted together with the sound of the known music source, there is a risk that the sound of the spreading code signal is perceived as noise by human hearing.

Figure 10:
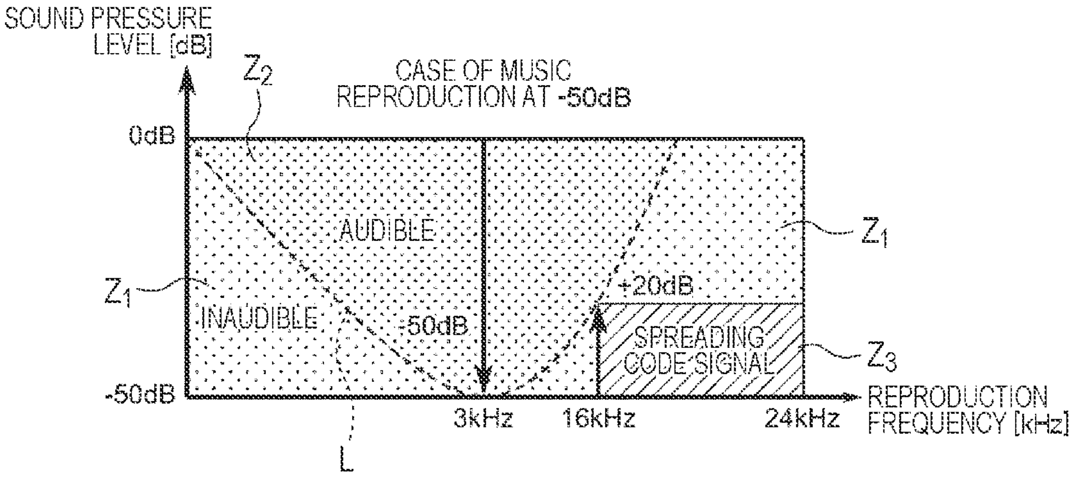
FIG. 10 is a diagram illustrating a frequency shift of a spreading code.

For example, in a case where it is assumed that music is reproduced at −50 dB, a range below a sensitivity curve L in FIG. 10 is set as a range Z1 inaudible to humans (range difficult to recognize by human hearing), and a range above the sensitivity curve L is set as a range Z2 audible to humans (range easy to recognize by human hearing).

In FIG. 10, the horizontal axis represents the frequency band, and the vertical axis represents the sound pressure level.

Therefore, for example, when the range in which the sound of the reproduced known music source and the sound of the spreading code signal can be separated from each other is within −30 dB, the sound of a spreading code signal output in the range of 16 kHz to 24 kHz indicated by a range Z3 within the range Z1 can be made inaudible to humans (made difficult to recognize by human hearing).

Figure 11:
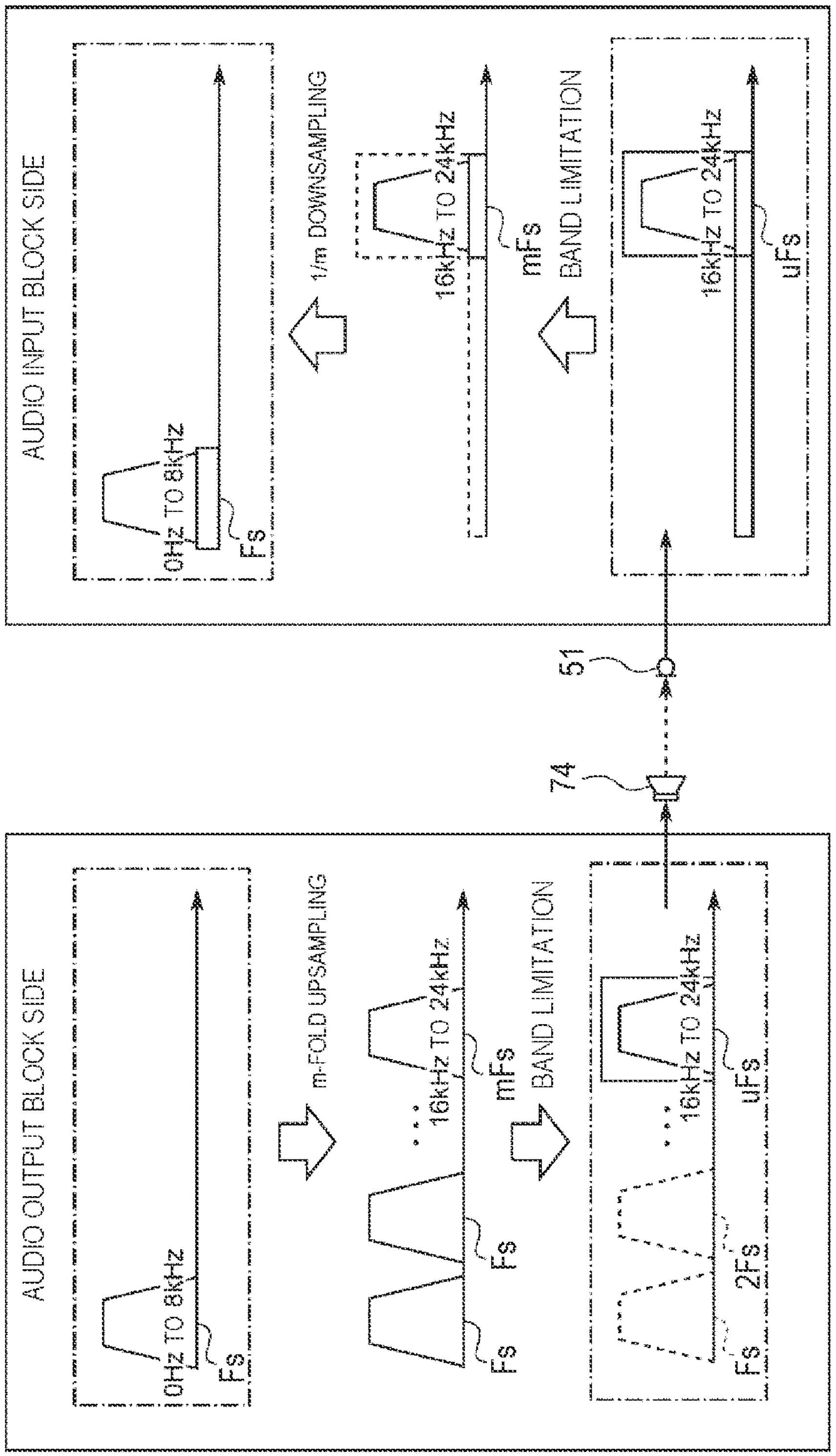
FIG. 11 is a diagram illustrating a procedure of frequency shift of a spreading code.

Hence, as illustrated in the upper left part of FIG. 11, the frequency shift processing unit 82 upsamples a spreading code signal Fs including the spreading code m times as illustrated in the middle left part to generate spreading code signals Fs, 2Fs, . . . mFs.

Then, as illustrated in the lower left part of FIG. 11, the frequency shift processing unit 82 applies band limitation to a spreading code signal uFs of 16 kHz to 24 kHz which is the frequency band inaudible to humans described with reference to FIG. 10, thereby frequency-shifting the spreading code signal Fs including the spreading code signal and causing the audio output unit 74 to emit sound together with the known music source.

As illustrated in the lower right part of FIG. 11, the inverse shift processing unit 130 extracts the spreading code signal uFs as illustrated in the middle right part of FIG. 11 by limiting the band to the range of 16 kHz to 24 kHz with respect to the sound from which the known music source has been removed by the known music source removal unit 91 from the sound collected by the audio input unit 51.

Then, as illustrated in the upper right part of FIG. 10, the inverse shift processing unit 130 performs downsampling to 1/m to generate the spreading code signal Fs including the spreading code, thereby restoring the frequency band to the original band.

By performing the frequency shift in this manner, even if the sound including the spreading code signal is emitted in a state where the sound of the known music source is emitted, it is possible to make the sound including the spreading code signal less audible (less recognizable by human hearing).

Figure 12:
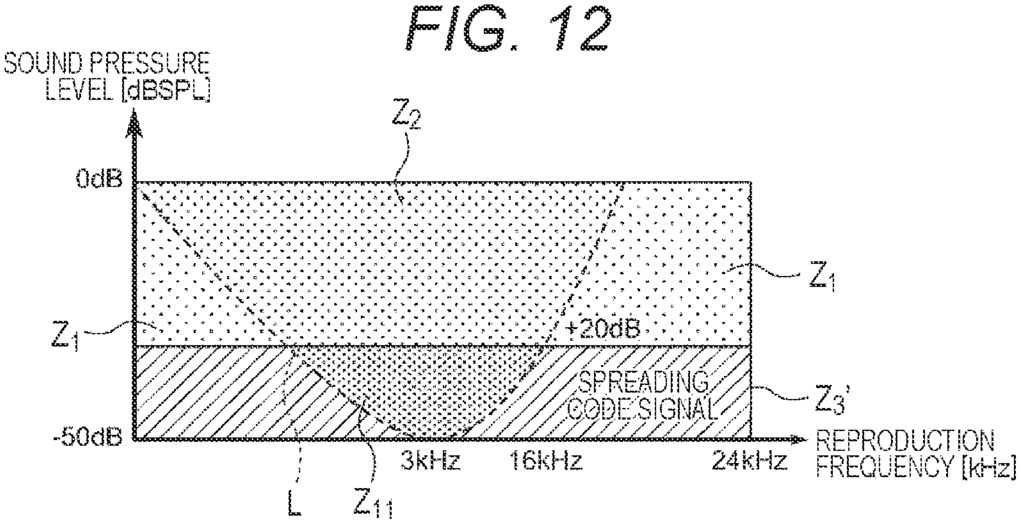
FIG. 12 is a diagram illustrating an example in a case of considering multipath.

Note that hereinabove, an example has been described in which the sound including the spreading code signal is made less audible to humans (made difficult to be recognized by human hearing) by the frequency shift. However, since sound of a high frequency has high rectilinearity and is susceptible to multipath due to reflection from a wall or the like and sound blocking by a shielding object, it is desirable to also use sound of a lower band including a low frequency band of 10 kHz or less, such as around 3 kHz, which is easily diffracted, as illustrated in FIG. 12. FIG. 12 illustrates an example of a case where sound of the spreading code signal is output even in a range including a low frequency band of 10 kHz or less indicated by a range Z3' Therefore, in the case of FIG. 12, in a range Z11, the sound of the spreading code signal is also easily recognized by human hearing.

In such a case, for example, the sound pressure level of the known music source is set to −50 dB, the range necessary for the separation is set to −30 dB, and then the spreading code signal may be auditorily masked with the known music by an auditory compression method used in ATRAC (registered trademark), MP3 (registered trademark), or the like, and the spreading code signal may be emitted so as to be inaudible.

More specifically, the frequency component of the music to be reproduced may be analyzed every predetermined reproduction unit time (e.g., in units of 20 ms), and the sound pressure level of the sound of the spreading code signal for each critical band (24 bark) may be dynamically increased or decreased according to the analysis result so as to be auditorily masked.

<Arrival Time Difference Distance>

Figure 13:
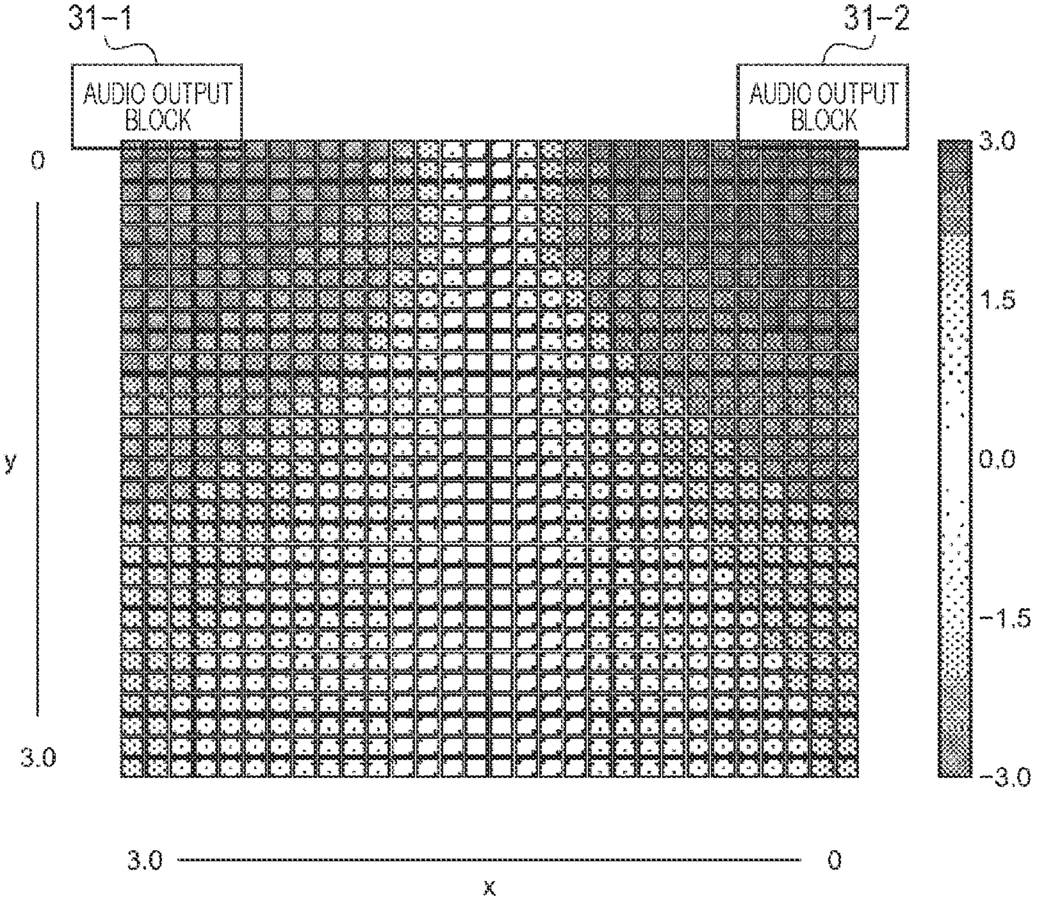
FIG. 13 is a diagram illustrating an arrival time difference distance.

Next, the arrival time difference distance will be described with reference to FIG. 13. FIG. 13 is a plot diagram of arrival time difference distances according to positions with respect to the audio output blocks 31-1 and 31-2. Note that in FIG. 13, positions in the front direction in which the audio output blocks 31-1 and 31-2 emit sound are represented by the y axis, and positions in a direction perpendicular to the direction in which the audio output blocks 31-1 and 31-2 emit sound are represented by the x axis. A distribution obtained by plotting the arrival time difference distances obtained when each of x and y is represented in normalized units is illustrated.

That is, in FIG. 13, the audio output blocks 31-1 and 31-2 are separated by three normalized units in the x-axis direction, and a plot result of the arrival time difference distance in a range of three units in the y-axis direction from the audio output blocks 31-1 and 31-2 is illustrated.

As illustrated in FIG. 13, since there is a correlation with the arrival time difference distance in the x-axis direction, it is considered that the x-axis direction can be obtained with a predetermined accuracy or more.

However, regarding the y-axis direction, in particular, there is no correlation in the vicinity of a position of 1.5 units in the x-axis direction, that is, in the vicinity of the center between the audio output blocks 31-1 and 31-2, and thus, it is considered that the y-axis direction cannot be obtained with a predetermined accuracy or more.

As a result, it is considered that only the position in the x-axis direction can be obtained with a predetermined accuracy or more only by using the arrival time difference distance.

<Peak Power Ratio>

Figure 14:
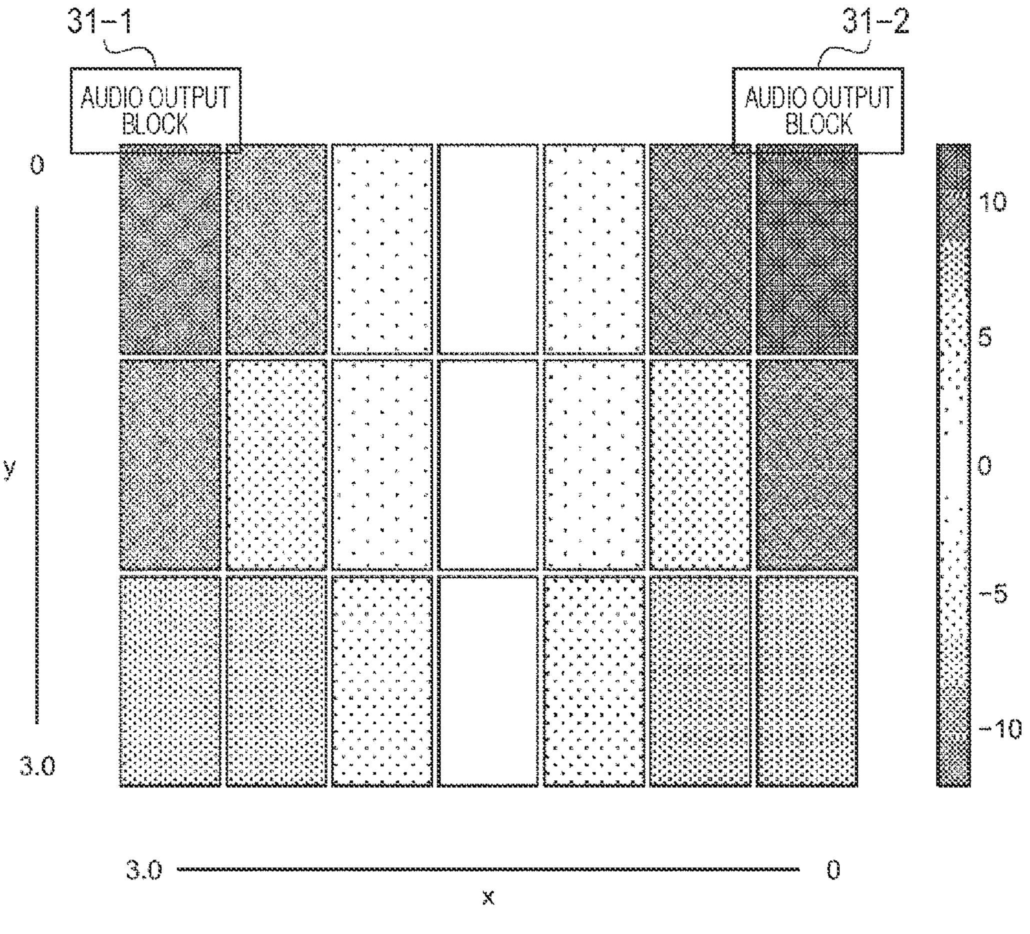
FIG. 14 is a diagram illustrating a peak power ratio.

Next, the peak power ratio will be described with reference to FIG. 14. FIG. 14 is a plot diagram of peak power ratios according to positions with respect to the audio output blocks 31-1 and 31-2.

Note that in FIG. 14, positions in the front direction in which the audio output blocks 31-1 and 31-2 emit sound are represented by the y axis, and positions in a direction perpendicular to the direction in which the audio output blocks 31-1 and 31-2 emit sound are represented by the x axis. A distribution obtained by plotting the peak power ratios obtained when each of x and y is represented in normalized units is illustrated.

That is, in FIG. 14, the audio output blocks 31-1 and 31-2 are separated by three normalized units in the x-axis direction, and a plot result of the peak power in a range of three units in the y-axis direction from the audio output blocks 31-1 and 31-2 is illustrated.

As illustrated in FIG. 14, since there is a correlation with the peak power ratio in both the x-axis direction and the y-axis direction, it is considered that both the x-axis direction and the y-axis direction can be obtained with a predetermined accuracy or more.

Configuration Example of First Embodiment of Position Calculation Unit

From the above, it is considered that the position (x, y) of the electronic device 32 (audio input block 41) with respect to the audio output blocks 31-1 and 31-2 can be obtained with a predetermined accuracy or more by machine learning using the arrival time difference distance and the peak power ratio.

However, here, it is assumed that the positions of the audio output blocks 31-1 and 31-2 are fixed at known positions, or the position of any one of the audio output blocks 31-1 and 31-2 is known and the mutual distance is known.

Figure 15:
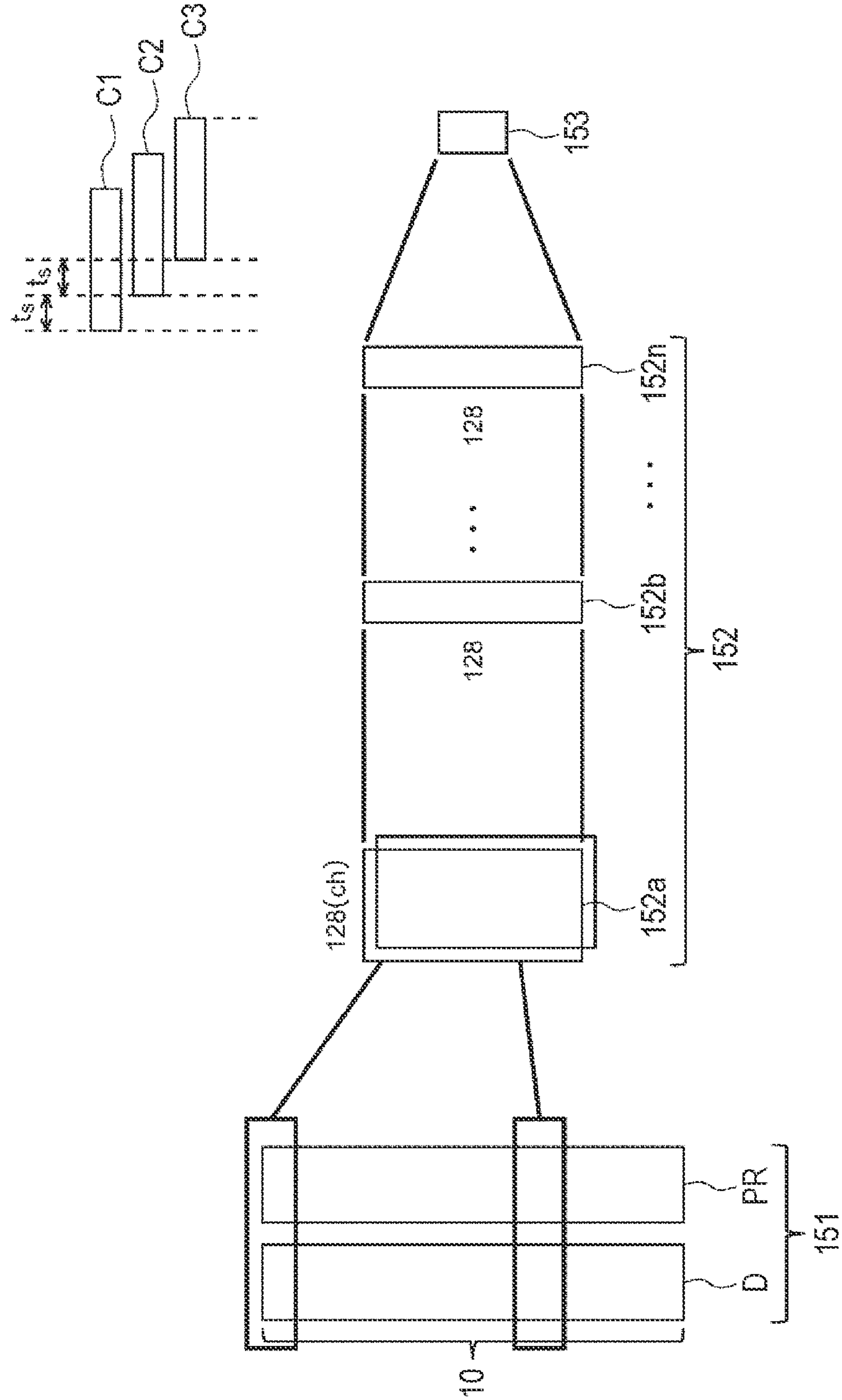
FIG. 15 is a diagram illustrating a configuration example of a first embodiment of a position calculation unit.

Therefore, for example, as illustrated in FIG. 15, the position calculator 113 forms a predetermined hidden layer 152 by machine learning with respect to an input layer 151 including a predetermined number of data including an arrival time difference distance D and a peak power ratio PR, and obtains an output layer 153 including the position (x, y) of the electronic device 32 (audio input block 41).

More specifically, for example, as illustrated in the upper right part of FIG. 15, for 32760 samples, the number of data 10 obtained by performing peak calculation while sliding time ts for each of sets C1, C2, C3 . . . of 3276 samples is set as information of one input layer.

That is, it is assumed that the input layer 151 including the arrival time difference distance D and the peak power ratio PR for which peak calculation has been performed is formed by the number of data 10.

The hidden layer 152 includes, for example, n layers of a first layer **152*a* to an n-th layer 152*n*. The first layer 152*a* at the head is a layer having a function of masking data satisfying a predetermined condition with respect to data of the input layer 151, and is formed as, for example, a 1280-ch layer. Each of a second layer 152*b* to the n-th layer 152*n* includes 128**-ch layers.

As data that does not satisfy a predetermined condition as data of the input layer 151, for example, the first layer **152*a*** masks data that does not satisfy a condition that an SN ratio of a peak is 8 times or more or an arrival time difference distance is 3 m or less, and masks the data so as not to be used for processing in a subsequent layer.

As a result, the second layer **152*b* to the n-th layer 152*n* of the hidden layer 152 obtain the two-dimensional position (x, y) of the electronic device 32 to be the output layer 153 using only the data satisfying the predetermined condition in the data of the input layer 151**.

The position calculator 113 having such a configuration outputs the position (x, y) of the electronic device 32 (audio input block 41), which is the output layer 153, for the input layer 151 including the arrival time difference distance D and the peak power ratio PR by the hidden layer 152 formed by machine learning.

<Sound Emission Processing>

Figure 16:
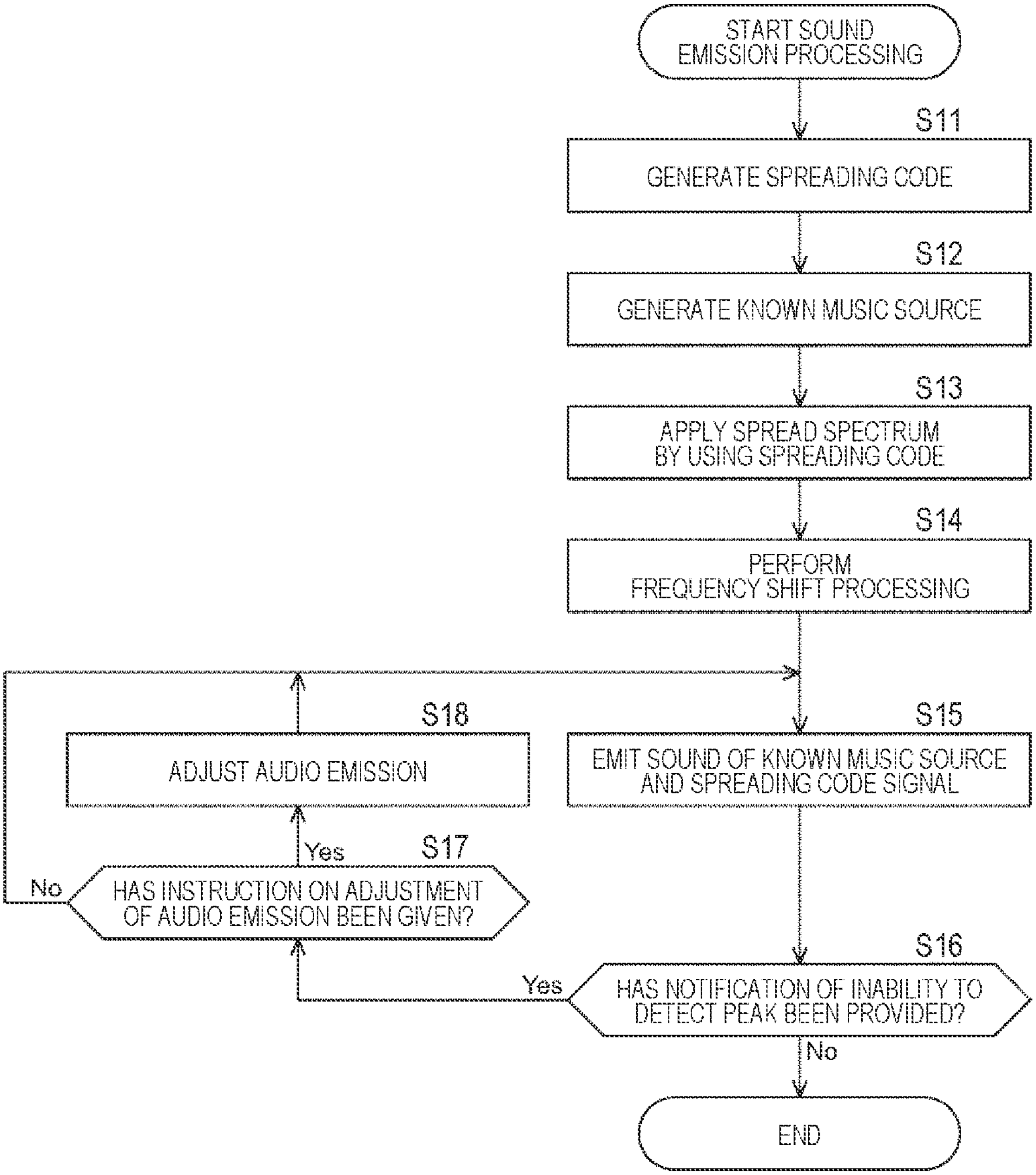
FIG. 16 is a flowchart illustrating sound emission processing by an audio output block.

Next, sound emission (output) processing by the audio output block 31 will be described with reference to a flowchart of FIG. 16.

In step S11, the spreading code generation unit 71 generates a spreading code and outputs the spreading code to the audio generation unit 73.

In step S12, the known music source generation unit 72 generates a stored known music source and outputs the known music source to the audio generation unit 73.

In step S13, the audio generation unit 73 controls the spreading unit 81 to multiply a predetermined data code by the spreading code and perform spread spectrum modulation to generate a spreading code signal.

In step S14, the audio generation unit 73 controls the frequency shift processing unit 82 to frequency-shift the spreading code signal as described with reference to the left part of FIG. 11.

In step S15, the audio generation unit 73 outputs the known music source and the frequency-shifted spreading code signal to the audio output unit 74 including a speaker, and emits (outputs) the signals as a sound with a predetermined audio output.

By performing the above processing in each of the audio output blocks 31-1 and 31-2, it is possible to emit and allow the user who possesses the electronic device 32 to listen to sound as the known music source.

Furthermore, since the spreading code signal can be shifted to a frequency band that cannot be heard by a human who is the user and be output as sound, the electronic device 32 can measure the distance to the audio output block 31 on the basis of the emitted sound including the spreading code signal shifted to the frequency band that cannot be heard by humans without causing the user to hear an unpleasant sound.

In step S16, the audio generation unit 73 controls the communication unit 75 to determine whether or not notification of the inability to detect a peak by processing to be described later has been provided by the electronic device 32. In step S16, in a case where the notification of the inability to detect a peak has been provided, the processing proceeds to step S17.

In step S17, the audio generation unit 73 controls the communication unit 75 to determine whether or not a command for giving an instruction on adjustment of audio emission output has been transmitted from the electronic device 32.

In step S17, in a case where it is determined that a command for giving an instruction on adjustment of audio emission output has been transmitted, the processing proceeds to step S18.

In step S18, the audio generation unit 73 adjusts audio output of the audio output unit 74, and the processing returns to step S15. Note that in step S17, in a case where a command for giving an instruction on adjustment of audio emission output has not been transmitted, the processing of step S18 is skipped.

That is, in a case where no peak is detected from the audio emission output, the processing of emitting sound is repeated until a peak is detected. At this time, when a command for giving an instruction on adjustment of the audio emission output is transmitted from the electronic device 32, the audio generation unit 73 controls the audio output unit 74 on the basis of this command to adjust the audio output, and performs adjustment such that a peak is detected from the sound emitted by the electronic device 32.

Note that the command for giving an instruction on adjustment of audio emission output transmitted from the electronic device 32 will be described later in detail.

Figure 3:
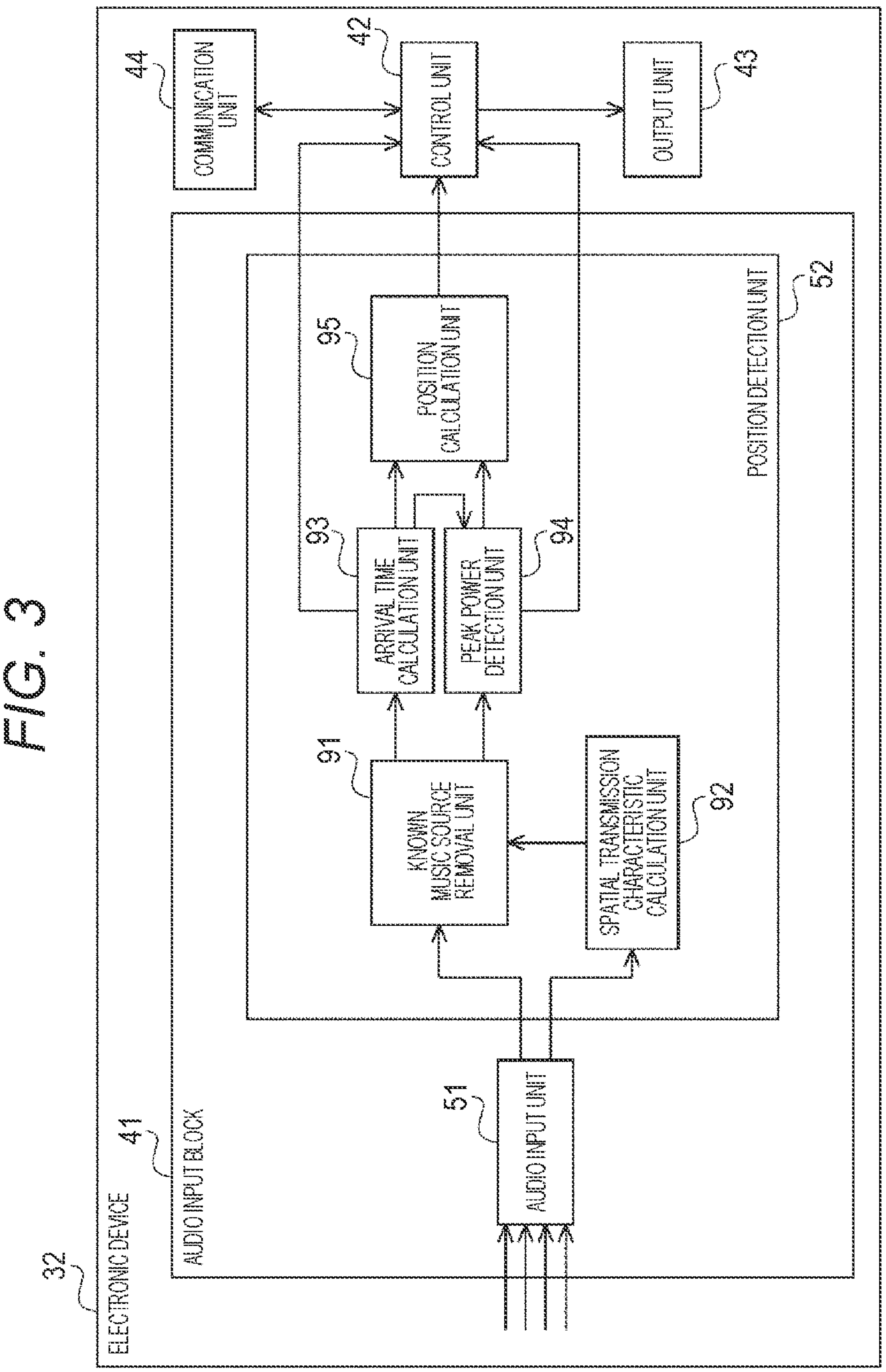
FIG. 3 is a diagram illustrating a configuration example of an electronic device in FIG. 1.

<Sound Collection Processing by Electronic Device 32 in FIG. 3>

Next, sound collection processing by the electronic device 32 of FIG. 3 will be described with reference to a flowchart of FIG. 17.

In step S31, the audio input unit 51 including a microphone collects sound and outputs the collected sound to the known music source removal unit 91 and the spatial transmission characteristic calculation unit 92.

In step S32, the spatial transmission characteristic calculation unit 92 calculates the spatial transmission characteristic on the basis of sound supplied from the audio input unit 51, the characteristic of the audio input unit 51, and the characteristic of the audio output unit 74 of the audio output block 31, and outputs the spatial transmission characteristic to the known music source removal unit 91.

In step S33, the known music source removal unit 91 generates an anti-phase signal of the known music source in consideration of the spatial transfer characteristic supplied from the spatial transmission characteristic calculation unit 92, removes a component of the known music source from the sound supplied from the audio input unit 51, and outputs the sound to the arrival time calculation unit 93 and the peak power detection unit 94.

In step S34, the inverse shift processing unit 130 of the arrival time calculation unit 93 inversely shifts the frequency band of the spreading code signal in which the known music source has been removed from the sound input by the audio input unit 51 supplied from the known music source removal unit 91 as described with reference to the right part of FIG. 11.

In step S35, the cross-correlation calculation unit 131 calculates the cross-correlation between the spreading code signal obtained by inversely shifting the frequency band and removing the known music source from the sound input by the audio input unit 51 and the spreading code signal of the sound output from the audio output block 31 by the calculation using the formulae (1) to (4) described above.

In step S36, the peak detection unit 132 detects a peak in the calculated cross-correlation.

In step S37, the peak power detection unit 94 detects power of the frequency band component of the spreading code signal at the timing when the cross-correlation according to the distance to each of the detected audio output blocks 31-1 and 31-2 peaks as the peak power, and outputs the peak power to the position calculation unit 95.

In step S38, the control unit 42 determines whether or not a peak of cross-correlation according to the distance to each of the audio output blocks 31-1 and 31-2 has been detected in the arrival time calculation unit 93.

At step S38, in a case where it is determined that a peak of cross-correlation has not been detected, the processing proceeds to step S39.

In step S39, the control unit 42 controls the communication unit 44 to notify the electronic device 32 that a peak of cross-correlation has not been detected.

In step S40, the control unit 42 determines whether or not any one of the peak powers of the audio output blocks 31-1 and 31-2 is larger than a predetermined threshold. That is, it is determined whether or not any one of the peak powers corresponding to the distance to each of the audio output blocks 31-1 and 31-2 has an extremely large value.

In a case where it is determined in step S40 that any one of the peak powers is larger than the predetermined threshold, the processing proceeds to step S41.

In step S41, the control unit 42 controls the communication unit 44 to transmit a command for instructing the electronic device 32 to adjust the audio emission output, and the processing returns to step S31. Note that in a case where it is not determined in step S40 that any one of the peak powers is larger than the predetermined threshold, the processing of step S41 is skipped.

That is, the audio emission is repeated until a peak of cross-correlation is detected, and the audio emission output is adjusted in a case where any one of the peak powers is larger than the predetermined threshold value. At this time, the levels of the audio emission outputs of both the audio output blocks 31-1 and 31-2 are equally adjusted so as not to affect the peak power ratio.

In a case where it is determined in step S38 that a peak of cross-correlation is detected, the processing proceeds to step S342.

In step S42, the peak power ratio calculation unit 112 of the position calculation unit 95 calculates a ratio of peak power corresponding to the distance to each of the audio output blocks 31-1 and 31-2 as a peak power ratio, and outputs the peak power ratio to the position calculator 113.

In step S43, the peak detection unit 132 of the arrival time calculation unit 93 outputs the time detected as the peak in cross-correlation to the position calculation unit 95 as the arrival time.

Note that the cross-correlation with the spreading code signal of the sound output from each of the audio output blocks 31-1 and 31-2 is calculated, whereby the arrival time corresponding to each of the audio output blocks 31-1 and 31-2 is obtained.

In step S44, the arrival time difference distance calculation unit 111 of the position calculation unit 95 calculates the arrival time difference distance on the basis of the arrival time according to the distance to each of the audio output blocks 31-1 and 31-2, and outputs the arrival time difference distance to the position calculator 113.

In step S45, the position calculator 113 forms the input layer 151 described with reference to FIG. 15 on the basis of the arrival time difference distance supplied from the arrival time difference distance calculation unit 111 and the peak power ratio supplied from the peak power ratio calculation unit 112, and masks data not satisfying a predetermined condition with the first layer 152*a* at the head of the hidden layer 152.

In step S46, the position calculator 113 calculates the two-dimensional position of the electronic device 32 as the output layer 153 by sequentially using the second layer 152*b* to the n-th layer 152*n* of the hidden layer 152 described with reference to FIG. 15, and outputs the two-dimensional position to the control unit 42.

In step S47, the control unit 42 executes processing based on the obtained two-dimensional position of the electronic device 32, and ends the processing.

For example, the control unit 42 controls the communication unit 44 to transmit a command for controlling the level and timing of the sound output from the audio output unit 74 of the audio output blocks 31-1 and 31-2 to the audio output blocks 31-1 and 31-2 so that a sound field based on the obtained position of the electronic device 32 can be achieved.

As a result, in the audio output blocks 31-1 and 31-2, the sound field control unit 83 controls the level and timing of the sound output from the audio output unit 74 so as to achieve the sound field corresponding to the position of the user who possesses the electronic device 32 on the basis of the command transmitted from the electronic device 32.

With such processing, the user wearing the electronic device 32 can listen to the music output from the audio output blocks 31-1 and 31-2 in an appropriate sound field corresponding to the movement of the user in real time.

As described above, the position of the electronic device 32 with respect to the audio output blocks 31-1 and 31-2 can be obtained only by the two audio output blocks 31-1 and 31-2 forming a general stereo speaker and the electronic device 32 (audio input block 41).

Furthermore, at this time, it is possible to obtain the position of the electronic device 32 in real time by emitting a spreading code signal using sound in a band that is less audible to humans and measuring a distance between the audio output block 31 and the electronic device 32 including the audio input block 41.

Moreover, a speaker included in the audio output unit 74 of the audio output block 31 and a microphone included in the audio input unit 51 of the electronic device 32 of the present disclosure can be implemented at low cost because existing speakers can use the two audio devices, for example, and time and effort required for installation can be simplified.

Furthermore, since sound is used and an existing audio device can be used, it is not necessary to obtain a license or the like for authentication required in a case where radio waves or the like are used, and thus, it is possible to reduce cost and labor related to use in this respect as well.

Moreover, it is possible to measure the position of the user who carries or wears the electronic device 32 in real time while allowing the user to listen to music or the like by reproduction of a known music source without hearing an unpleasant sound.

Note that hereinabove, an example has been described in which the two-dimensional position of the electronic device 32 is obtained by the learning device formed by machine learning on the basis of the arrival time difference distance and the peak power ratio. However, the two-dimensional position may be obtained on the basis of an input including only the arrival time difference distance or only the peak power ratio.

However, in the case where the two-dimensional position is obtained on the basis of an input including only the arrival time difference distance or only the peak power ratio, the accuracy decreases. Hence, it may be advantageous to devise or limit the use method.

For example, in a case where an input is formed only by the arrival time difference distance, the accuracy of the position in the y direction is assumed to be low, and thus it may be advantageous to use only the position in the x direction.

Furthermore, for example, in a case where an input is formed only by the peak power ratio, it is assumed that the accuracy decreases when a position is a predetermined distance or farther away from the audio output block 31. Therefore, it may be advantageous to use only a two-dimensional position in a range within a predetermined distance from the audio output block 31.

Moreover, in the above description, information when a peak of cross-correlation is detected is used as the input layer, but information when a peak of cross-correlation cannot be detected may be used as the input layer. As a result, for example, when a position is extremely close to one audio output block 31, an audio signal from the other audio output block 31 cannot be received, and a peak may not be detected. Therefore, even in such a case, a two-dimensional position can be appropriately identified.

Furthermore, the example of identifying the two-dimensional position of the electronic device 32 (audio input block 41) with respect to the audio output blocks 31-1 and 31-2 has been described above. However, in a case where only the position of the electronic device 32 and any one of the audio output blocks 31-1 and 31-2 is known, it is also possible to identify the position of the audio output block 31 whose position is unknown by similar processing.

2. Application Example of First Embodiment

Example in which Distance Between Audio Output Blocks is Input Layer

Hereinabove, the technology of the present disclosure has been described with respect to an example in which, in a home audio system including the two audio output blocks 31-1 and 31-2 and the electronic device 32, the position of the electronic device 32 including the audio input block 41 is obtained in real time, and sound output from the audio output block 31 is controlled on the basis of the position of the electronic device 32 to achieve an appropriate sound field.

However, in the above description, an example has been described in which the positions of the audio output blocks 31-1 and 31-2 are known, or at least one of the positions is known, and the distance between the positions is known.

For example, in addition to information of the input layer 151 including the arrival time difference distance D and the peak power ratio PR, an input layer 151α including a mutual distance SD may be further formed and input to the hidden layer 152.

Figure 18:
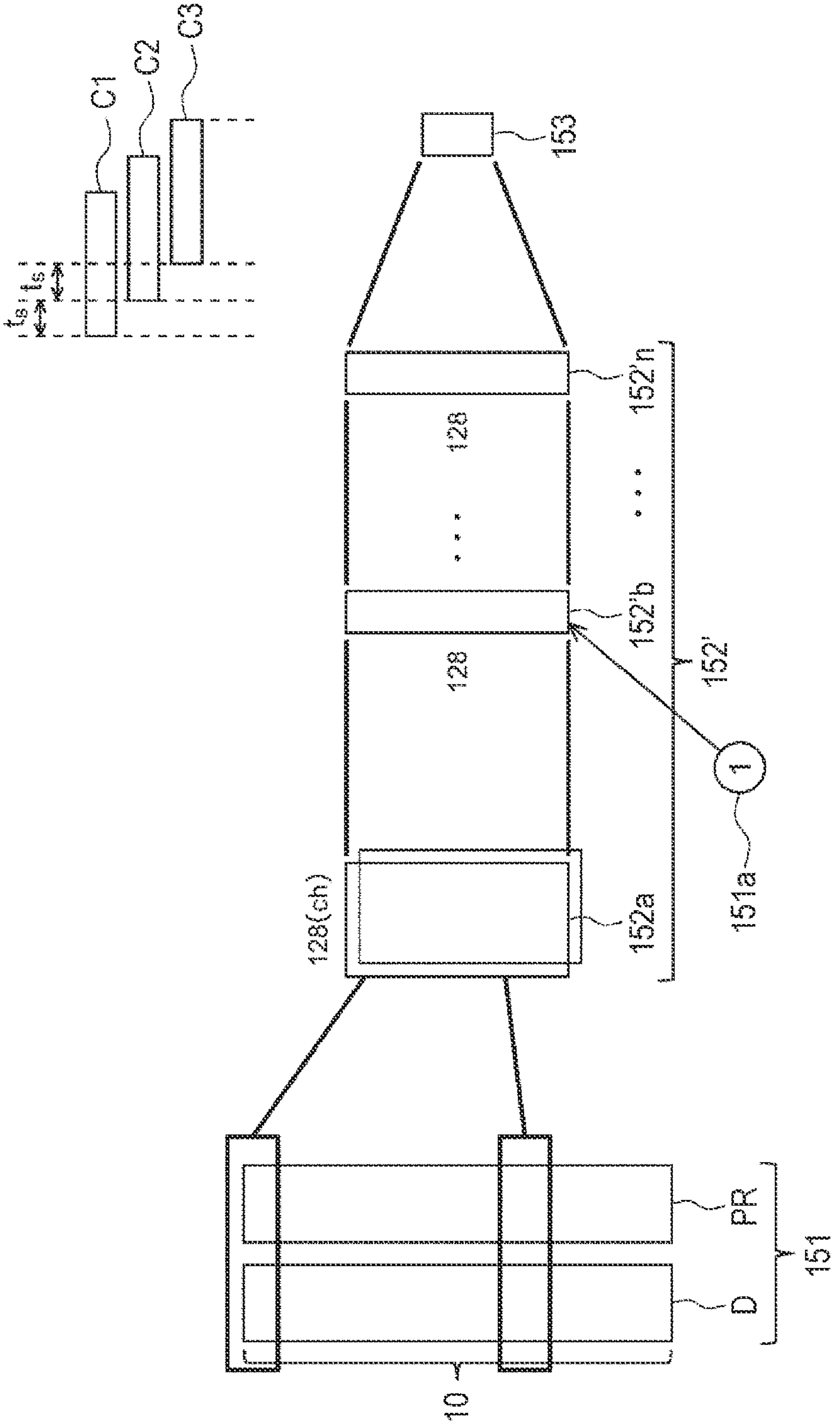
FIG. 18 is a diagram illustrating an application example of the first embodiment of the position calculation unit.

For example, as illustrated in FIG. 18, in a hidden layer 152', the arrival time difference distance D and the peak power ratio PR forming the first layer 152*a* and in which data that does not satisfy a predetermined condition is masked, and the input layer 151α including the mutual distance SD may be input to a second layer 152'*b*, and the position calculator 113 may obtain the position of the electronic device 32 as an output layer 153' by processing of the second layer 152'*b* to an n-th layer 152'*n*.

With such a configuration, even if the distance between the audio output blocks 31-1 and 31-2 variously changes, the position of the electronic device 32 can be obtained from the two audio output blocks 31-1 and 31-2 and one electronic device 32 (microphone).

3. Second Embodiment

Hereinabove, an example has been described in which the position of the electronic device 32 is identified by using the arrival time difference distance D when sound emitted from the audio output blocks 31-1 and 31-2 at known positions is collected by the electronic device 32 using the audio output blocks 31-1 and 31-2 and the electronic device 32 and the peak power ratio PR.

Incidentally, as described with reference to FIG. 13, the position in the x direction perpendicular to the audio emission direction of the audio output blocks 31-1 and 31-2 obtained by the above-described method can be obtained with relatively high accuracy.

On the other hand, as described with reference to FIG. 14, the position in the y direction that is the audio emission direction of the audio output blocks 31-1 and 31-2 is slightly less accurate than the accuracy of the position in the x direction.

Here, as illustrated in FIG. 1, in a case where the audio output blocks 31-1 and 31-2 are provided and the TV 30 is provided in a substantially central position between the audio output blocks 31-1 and 31-2, it is assumed that the user generally listens to sound emitted from the audio output blocks 31-1 and 31-2 while viewing the TV 30.

At this time, the sound emitted from the audio output blocks 31-1 and 31-2 that the user listens to is evaluated regarding audibility within a range defined by an angle set with reference to the central position of the TV 30.

Figure 19:
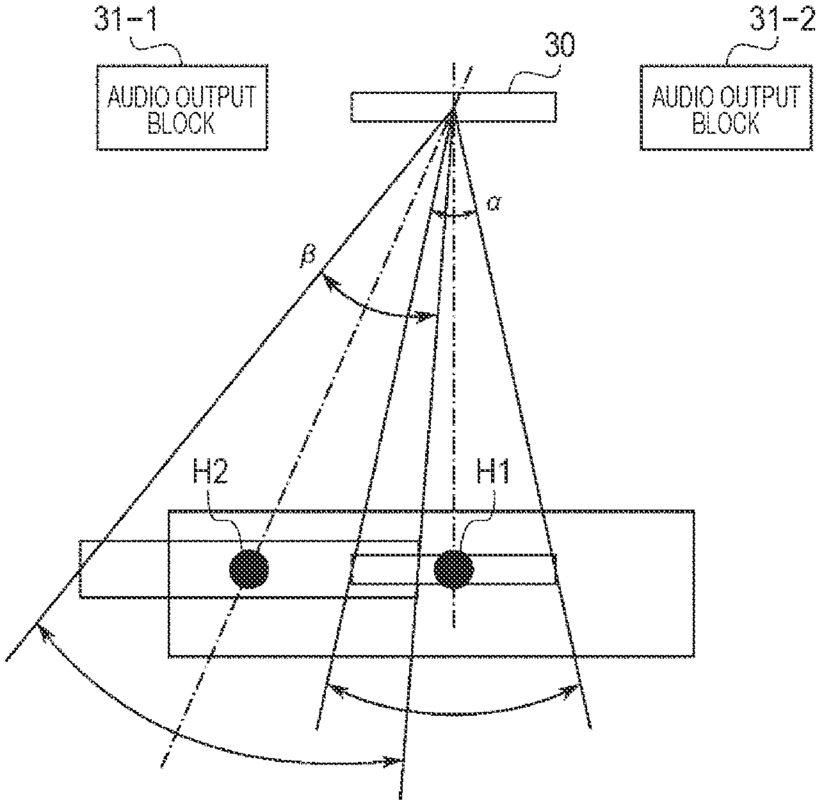
FIG. 19 is a diagram illustrating an audible range when a TV is set at a central position between audio output blocks.

For example, as illustrated in FIG. 19, a case is considered in which audio output blocks 31-1 and 31-2 are provided, and a TV 30 is set at a substantially central position between the audio output blocks 31-1 and 31-2 and in which the display surface is parallel to a straight line connecting the audio output blocks 31-1 and 31-2.

In this case, when a user H1 is present at a position facing the TV 30, the range of an angle α with reference to the central position of the TV 30 in FIG. 19 is set as the audible range, and in this range, audibility is higher at a position closer to the alternate long and short dash line in FIG. 19.

Furthermore, when a user H2 is present with respect to the TV 30, the range of an angle β with reference to the central position of the TV 30 in FIG. 19 is set as the audible range, and in this range, audibility is higher at a position closer to the alternate long and short dash line in FIG. 19.

That is, in a case where the audio output blocks 31-1 and 31-2 are provided, and the TV 30 is provided in a substantially central position between the audio output blocks 31-1 and 31-2, if the position in the x direction perpendicular to the audio emission direction of the audio output blocks 31-1 and 31-2 described above can be obtained with a certain degree of accuracy, it is possible to achieve better audibility than a predetermined level.

In other words, in a case where the audio output blocks 31-1 and 31-2 are provided and the TV 30 is provided in a substantially central position between the audio output blocks 31-1 and 31-2, even in a state where the position in the y direction, which is the audio emission direction of the audio output blocks 31-1 and 31-2 described above, is not obtained with predetermined accuracy, it is possible to achieve better audibility than a predetermined level as long as the position in the x direction is obtained with predetermined accuracy.

As a result, as described above, even if the accuracy of the position in the y direction is lower than the predetermined level, if the accuracy of the position in the x direction is equal to or higher than the predetermined level, it is possible to achieve good audibility equal to or higher than the predetermined level.

Figure 20:
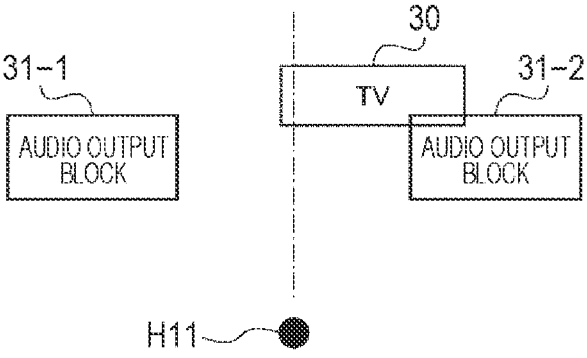
FIG. 20 is a diagram illustrating an audible range when the TV is not set at a central position between audio output blocks.

However, as illustrated in FIG. 20, assume a case where audio output blocks 31-1 and 31-2 are provided and a TV 30 is provided in a position deviated from the substantially central position between the audio output blocks 31-1 and 31-2. Here, regarding a user H11 in a position facing the substantially central position between the audio output blocks 31-1 and 31-2, since the viewing position of the TV 30 is deviated from the central position between the audio output blocks 31-1 and 31-2, there is a possibility that an appropriate sound field cannot be achieved by the emitted sound.

Therefore, in this case, in addition to the position of the electronic device 32 in the x direction with respect to the audio output blocks 31-1 and 31-2, the position in the y direction also needs to be obtained with accuracy higher than predetermined accuracy.

<Peak Power Frequency Component Ratio>

Therefore, the output layer including the position of the electronic device 32 may be obtained by forming a hidden layer by machine learning using the frequency component ratio between the peak power of cross-correlation of the high-frequency component and the peak power of cross-correlation of the low-frequency component of each of the audio output blocks 31-1 and 31-2, in addition to the arrival time difference distance D when sound emitted from the audio output blocks 31-1 and 31-2 is collected by the electronic device 32 and the peak power ratio PR.

Figure 21:
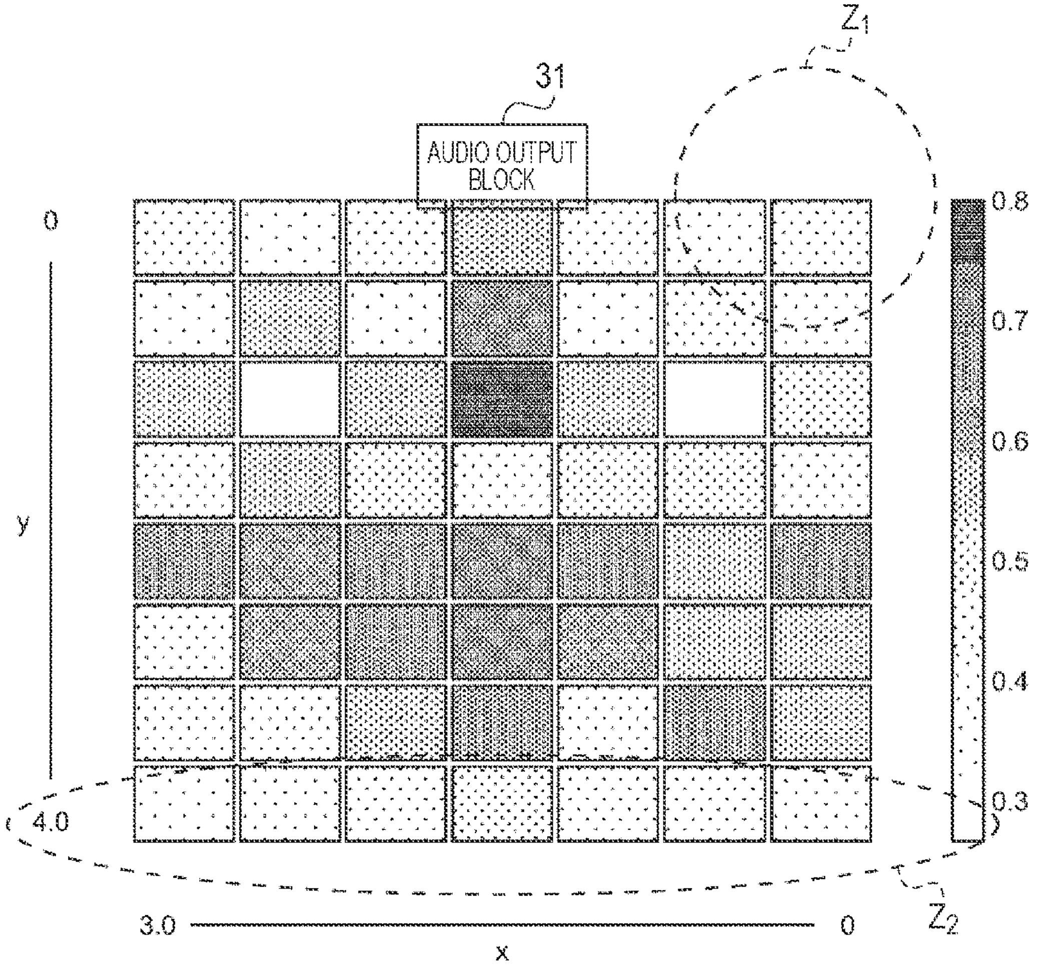
FIG. 21 is a diagram illustrating a peak power frequency component ratio.

For example, the distribution in the x direction and the y direction when the audio output block 31 having a peak power frequency component ratio FR (=HP/LP) as the central position is obtained from a peak power LP that is the power at the peak of cross-correlation of the low-frequency component (e.g., 18 kHz to 21 kHz) of the sound emitted from the audio output block 31 and a peak power HP that is the power at the peak of cross-correlation of the high-frequency component (e.g., 21 kHz to 24 kHz) of the sound emitted from the audio output block 31 is the distribution as illustrated in FIG. 21.

That is, as indicated by the distribution of the peak power frequency component ratio FR (=HP/LP) in FIG. 21, in the y direction that is the audio emission direction of the audio output block 31, the range facing the audio output block 31 has a higher correlation with the distance in the y direction, so that the position in the y direction can be identified with high accuracy.

However, as the distance from the audio output block 31 increases with respect to each of the x direction and the y-axis direction around the position of the audio output block 31 or as the angle becomes wider, that is, as the distance from the audio output block 31 increases or as the position becomes wider with respect to the audio emission direction, the peak power HP of the high-frequency component attenuates, so that the peak power frequency component ratio FR (=HP/LP) decreases as indicated by ranges Z1 and Z2 in FIG. 21, for example.

Therefore, since the accuracy of the position in the y direction needs to be determined according to the distance from the audio output block 31, for example, a value from the audio output block 31 to a predetermined distance may be adopted for the position in the y direction.

Note that since FIG. 21 illustrates an example of the component ratio FR of one audio output block 31, in a case where the two audio output blocks 31-1 and 31-2 are used, peak power frequency component ratios FRL and FRR are used in addition to the arrival time difference distance D and the peak power ratio PR to perform processing in the hidden layer, so that it is possible to obtain highly accurate positions of the electronic device 32 in the x direction and the y direction.

Figure 22:
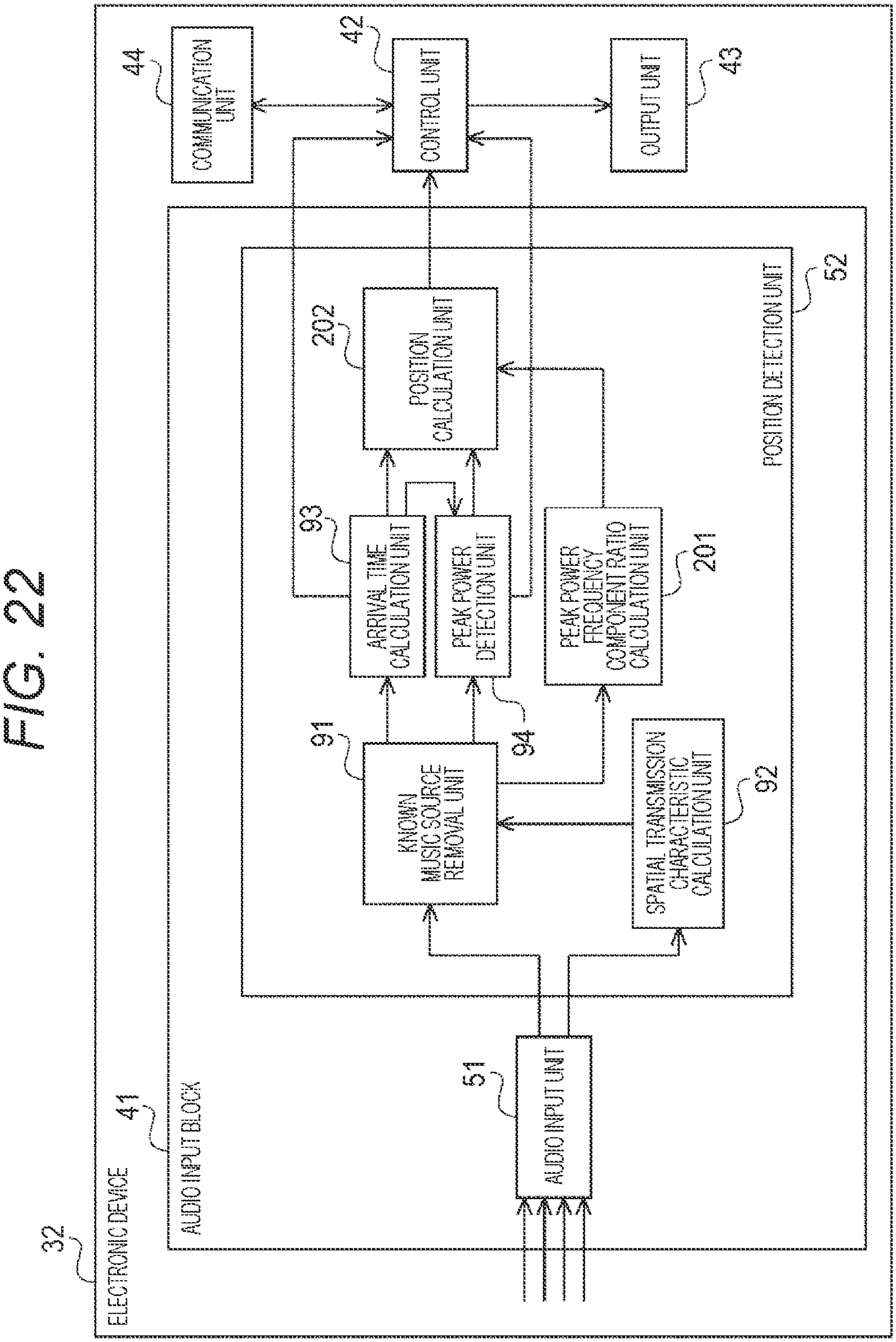
FIG. 22 is a diagram illustrating a configuration example of an electronic device in a second embodiment.

Configuration Example of Electronic Device in Case where Peak Power Frequency Component Ratio is Used as Input Layer Next, a configuration example of an electronic device 32 in which the peak power frequency component ratio FR (=HP/LP) obtained from the peak power LP of cross-correlation of the low-frequency component (e.g., 18 kHz to 21 kHz) and the peak power HP of cross-correlation of the high-frequency component (e.g., 21 kHz to 24 kHz) of sound emitted from the audio output block 31 is newly added and used for the input layer will be described with reference to FIG. 22.

Note that in an electronic device 32 in FIG. 22, components having the same functions as those of the electronic device 32 in FIG. 3 are denoted by the same reference numerals, and the description thereof will be appropriately omitted.

The electronic device 32 of FIG. 22 is different from the electronic device 32 of FIG. 3 in that a peak power frequency component ratio calculation unit 201 is newly provided and a position calculation unit 202 is provided instead of the position calculation unit 95.

The peak power frequency component ratio calculation unit 201 executes processing similar to the processing in the case of obtaining the peak of cross-correlation in the arrival time calculation unit 93 in each of the low frequency band (e.g., 18 kHz to 21 kHz) and the high frequency band (e.g., 21 kHz to 24 kHz) of sound emitted from each of the audio output blocks 31-1 and 31-2, and obtains the peak power LP of the low frequency band and the peak power HP of the high frequency band.

Then, the peak power frequency component ratio calculation unit 201 calculates the peak power frequency component ratios FRR and FRL in which the peak power HP in the high frequency band of each of the audio output blocks 31-1 and 31-2 are used as a numerator and the peak power LP in the low frequency band of each of the audio output blocks 31-1 and 31-2 are used as a denominator, and outputs the peak power frequency component ratios FRR and FRL to the position calculation unit 202. That is, the peak power frequency component ratio calculation unit 201 calculates the ratio of the peak power HP in the high frequency band to the peak power LP in the low frequency band of each of the audio output blocks 31-1 and 31-2 as the peak power frequency component ratios FRR and FRL, and outputs the ratios to the position calculation unit 202.

The position calculation unit 202 calculates the position (x, y) of the electronic device 32 by a neural network formed by machine learning on the basis of the arrival time, the peak power, and the peak power frequency component ratio of each of the audio output blocks 31-1 and 31-2.

Configuration Example of Position Calculation Unit in FIG. 22

Next, a configuration example of the position calculation unit 202 of the electronic device 32 in FIG. 22 will be described with reference to FIG. 23. Note that in the position calculation unit 202 in FIG. 23, components having the same functions as those of the position calculation unit 95 in FIG. 4 are denoted by the same reference numerals, and the description thereof will be appropriately omitted.

Figure 4:
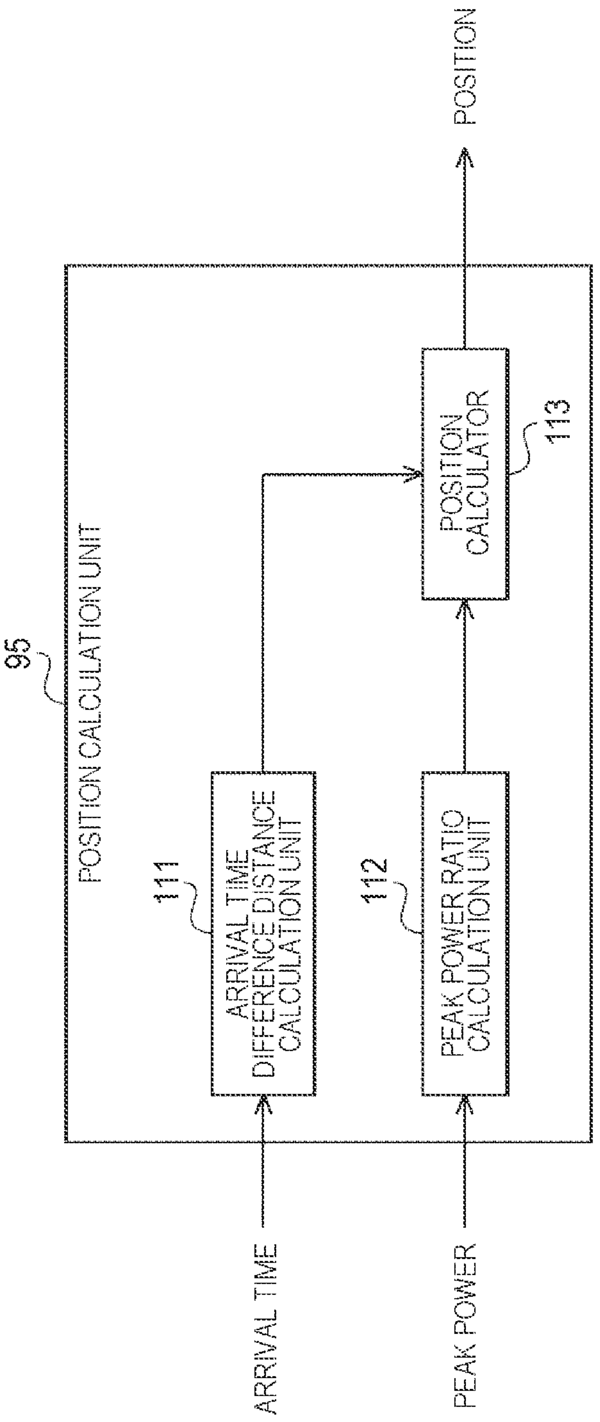
FIG. 4 is a diagram illustrating a configuration example of a position calculation unit in FIG. 3.
Figure 23:
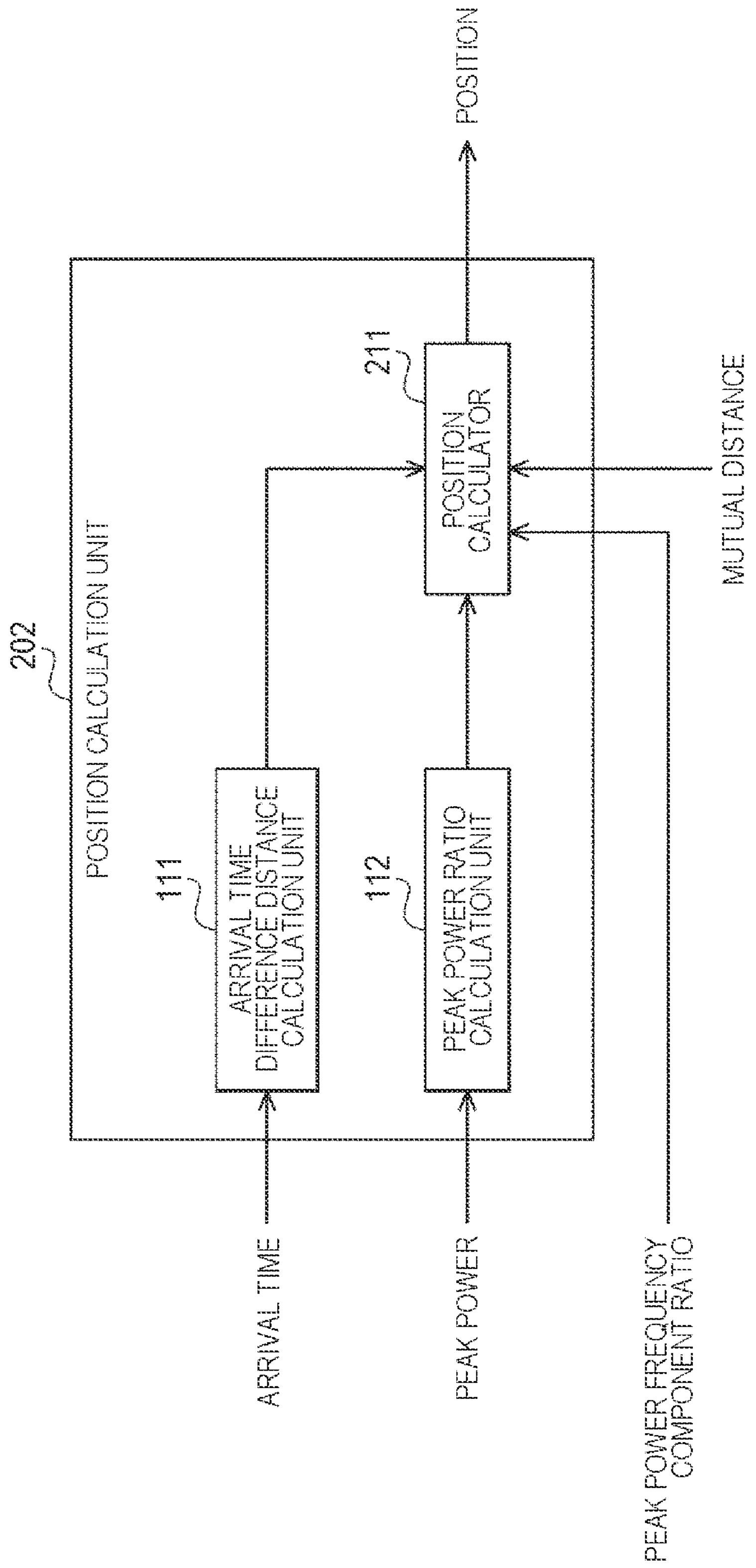
FIG. 23 is a diagram illustrating a configuration example of a position calculation unit in FIG. 22.

In the position calculation unit 202 of FIG. 23, a configuration different from the configuration of the position calculation unit 95 of FIG. 4 is that a position calculator 211 is provided instead of the position calculator 113.

The basic function of the position calculator 211 is similar to that of the position calculator 113. The position calculator 113 functions as a hidden layer using the arrival time difference distance and the peak power ratio as input layers, and obtains the position of the electronic device 32 as an output layer.

On the other hand, the position calculator 211 functions as a hidden layer with respect to an input layer including the peak power frequency component ratios FRR and FRL of the audio output blocks 31-1 and 31-2 and a mutual distance DS between the audio output blocks 31-1 and 31-2 in addition to the arrival time difference distance D and the peak power ratio PR, and obtains the position of the electronic device 32 as an output layer.

Figure 24:
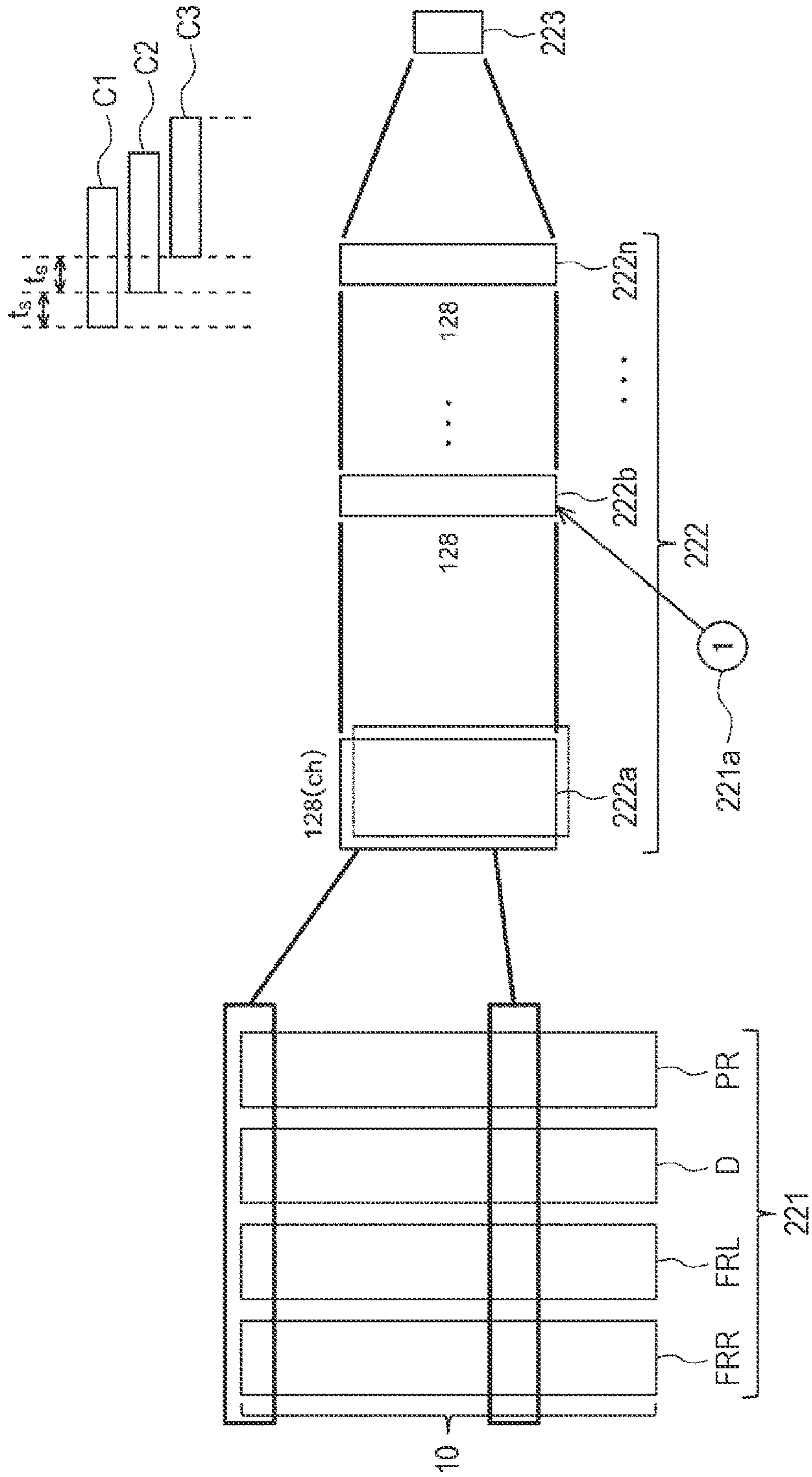
FIG. 24 is a diagram illustrating a configuration example of a second embodiment of a position calculation unit.

More specifically, as illustrated in FIG. 24, an input layer 221 in the position calculator 211 includes the arrival time difference distance D, the peak power ratio PR, and the peak power frequency component ratios FRR and FRL of the audio output blocks 31-1 and 31-2, respectively, and an input layer 221*a* includes the mutual distance DS between the audio output blocks 31-1 and 31-2.

Then, the position calculator 211 functions as a hidden layer 222 including a neural network including a first layer 222*a* to an n-th layer 222*n*, and an output layer 223 including the position (x, y) of the electronic device 32 is obtained.

Note that the input layer 221, the hidden layer 222, and the output layer 223 in FIG. 24 have configurations corresponding to the input layer 151, the hidden layer 152, and the output layer 153 in FIG. 15.

<Sound Collection Processing by Electronic Device 32 in FIG. 3>

Next, sound collection processing by the electronic device 32 of FIG. 22 will be described with reference to a flowchart of FIG. 25. Note that the sound emission processing is similar to the processing of FIG. 16, and thus the description thereof will be omitted.

Figure 17:
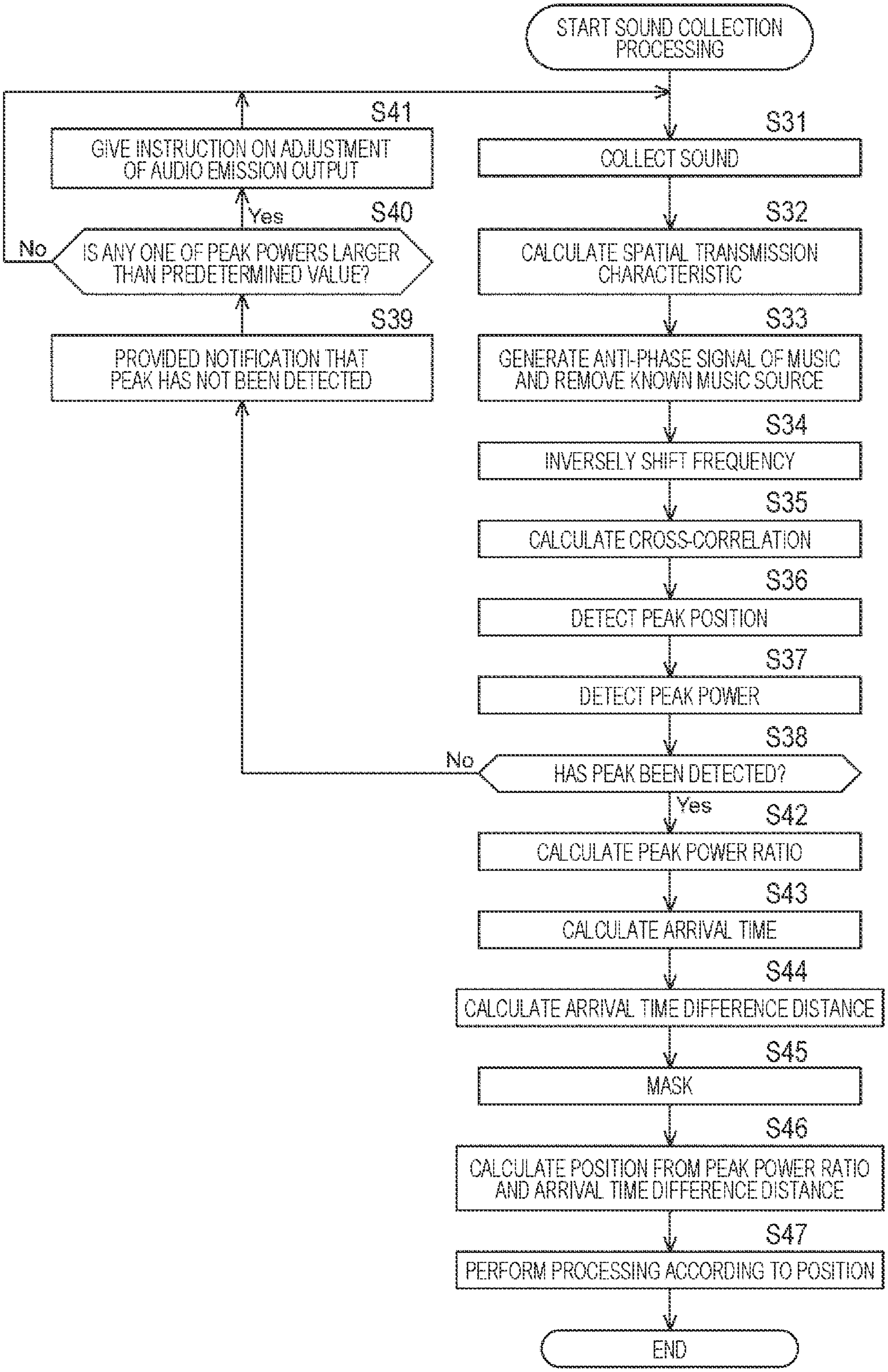
FIG. 17 is a flowchart illustrating sound collection processing by the electronic device in FIG. 3.
Figure 25:
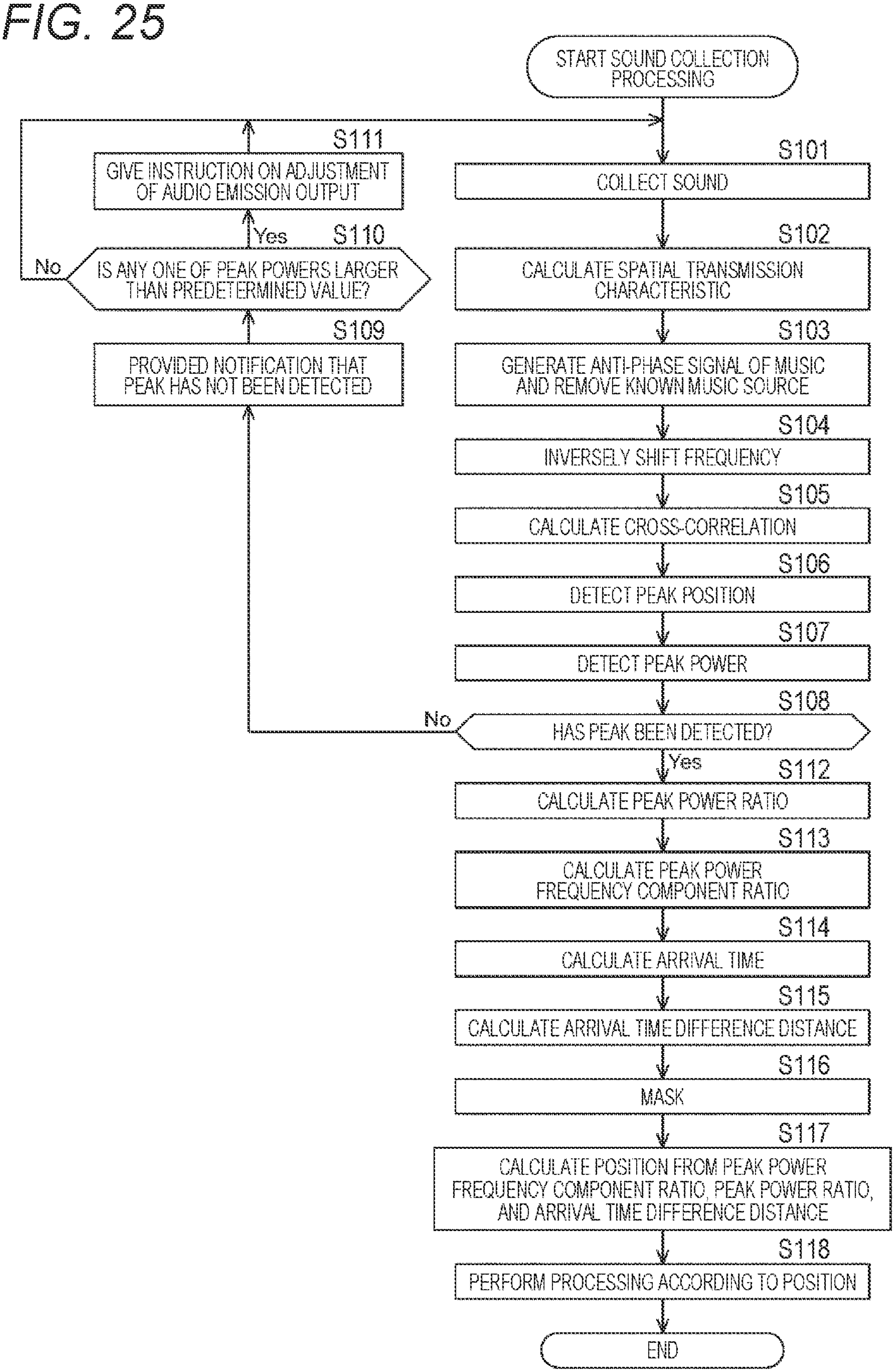
FIG. 25 is a flowchart illustrating sound collection processing by the electronic device in FIG. 22.

Note that the processing of steps S101 to S112, S114 to S116, and S118 in the flowchart of FIG. 25 is similar to the processing of steps S31 to S45, and S47 in the flowchart of FIG. 17, and thus the description thereof will be omitted.

That is, when the peak of cross-correlation is detected in steps S101 to S112 and the peak power ratio is calculated, the processing proceeds to step S113.

In step S113, the peak power frequency component ratio calculation unit 201 obtains a peak based on cross-correlation in each of the low frequency band (e.g., 18 kHz to 21 kHz) and the high frequency band (e.g., 21 kHz to 24 kHz) of sound emitted from each of the audio output blocks 31-1 and 31-2.

Then, the peak power frequency component ratio calculation unit 201 obtains the peak power LP in the low frequency band and the peak power HP in the high frequency band, calculates the ratio of the peak power LP in the low frequency band to the peak power HP in the high frequency band as the peak power frequency component ratios FRR and FRL, and outputs the ratios to the position calculation unit 202.

In steps S114 to S116, the arrival time is calculated, the arrival time difference distance is calculated, and data that does not satisfy a predetermined condition is masked.

In step S117, the position calculation unit 202 calculates the position (two-dimensional position (x, y)) of the electronic device 32 as the output layer 223 by sequentially executing processing by a second layer 222*b* to the n-th layer 222*n* of the hidden layer 222 with respect to the input layer 221 including the arrival time difference distance D, the peak power ratio PR, and the peak power frequency component ratios FRR and FRL of the audio output blocks 31-1 and 31-2 described with reference to FIG. 24 and the input layer 221*a* including the mutual distance DS, and outputs the position to the control unit 42.

In step S118, the control unit 42 executes processing based on the obtained position of the electronic device 32, and ends the processing.

As described above, the position of the electronic device 32 with respect to the audio output blocks 31-1 and 31-2 can be obtained with high accuracy in the x direction and the y direction only by the two audio output blocks 31-1 and 31-2 forming a general stereo speaker and the electronic device 32 (audio input block 41), even if the TV 30 is located at a position shifted from the central position between the audio output blocks 31-1 and 31-2.

4. Third Embodiment

The example has been described above in which the input layer 221 including the arrival time difference distance D, the peak power ratio PR, and the peak power frequency component ratios FRR and FRL of the audio output blocks 31-1 and 31-2 is formed, and processing is performed by the hidden layer 222 including a neural network formed by machine learning, thereby obtaining the position (x, y) of the electronic device 32 (audio input block 41) as the output layer 223.

However, even if the input layer is formed with the arrival time difference distance D and the peak power ratio PR by the two audio output blocks 31 and the electronic device 32 (audio input block 41), the position of the electronic device 32 in the x direction with respect to the audio output blocks 31-1 and 31-2, which is perpendicular to the audio emission direction of the audio output block 31, can be obtained with relatively high accuracy, but the accuracy of the position in the y direction is slightly poor.

Therefore, the position in the y direction may be obtained with high accuracy by providing an IMU in an electronic device 32, detecting the posture of the electronic device 32 when the electronic device 32 is tilted toward each of audio output blocks 31-1 and 31-2, and obtaining an angle θ between the audio output blocks 31-1 and 31-2 with reference to the electronic device 32.

Figure 26:
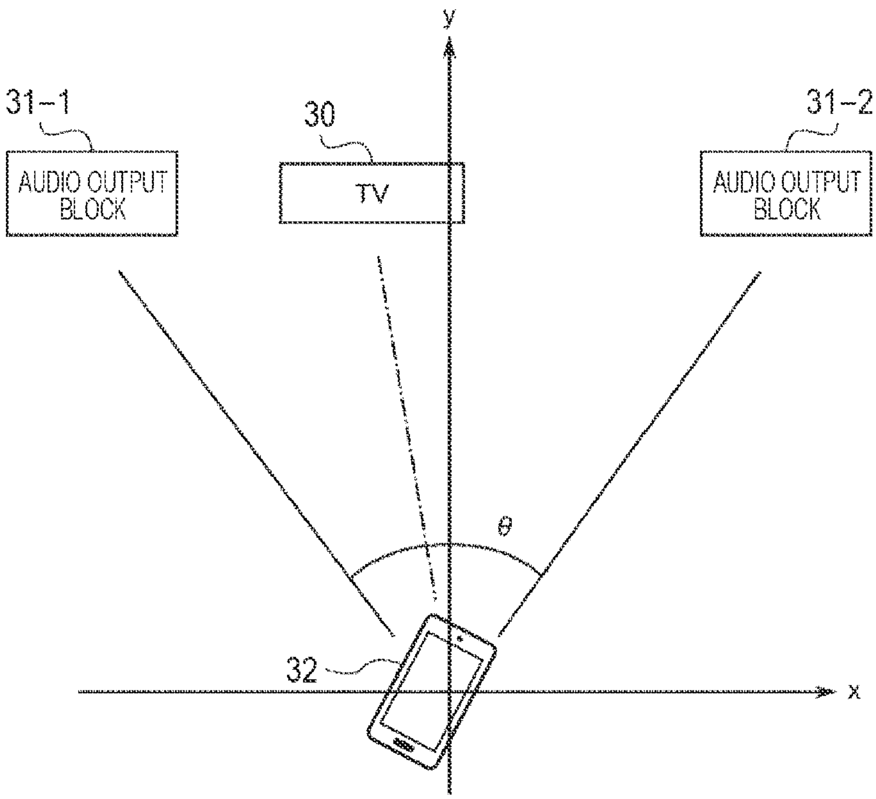
FIG. 26 is a configuration example of a home audio system in which an IMU is provided in an electronic device.

That is, the IMU is mounted on the electronic device 32, and as illustrated in FIG. 26, for example, a posture in a state where the upper end part of the electronic device 32 in FIG. 26 is directed to each of the audio output blocks 31-1 and 31-2 is detected, and the angle θ formed by the direction of each of the audio output blocks 31-1 and 31-2 is obtained from the detected posture change.

At this time, for example, the known positions of the audio output blocks 31-1 and 31-2 are expressed by (a1, b1) and (a2, b2), respectively, and the position of the electronic device 32 is expressed by (x, y). Note that x is a known value obtained by forming the input layer with the arrival time difference distance D and the peak power ratio PR.

A vector A1 to the audio output block 31-1 based on the position of the electronic device 32 is expressed by (a1-x, b1-y), and similarly, a vector A2 to the audio output block 31-2 is expressed by (x-a2, y-b2).

Here, the inner product (A1, A2) of the vectors A1 and A2 is expressed by a relational expression of $(A1, A2)=|A1|\cdot|A2| \cos \theta$. As described above, since the vectors A1 and A2 are known values except for y, the value of y may be obtained by solving y from the relational expression of the inner product.

Configuration Example of Electronic Device in which IMU is Provided

Next, a configuration example of the electronic device 32 in a case where the IMU is provided, the angle θ formed by the audio output blocks 31-1 and 31-2 with reference to the electronic device 32 is obtained, and the value of y is obtained from the angle θ using the relational expression of the inner product will be described with reference to FIG. 27.

Figure 27:
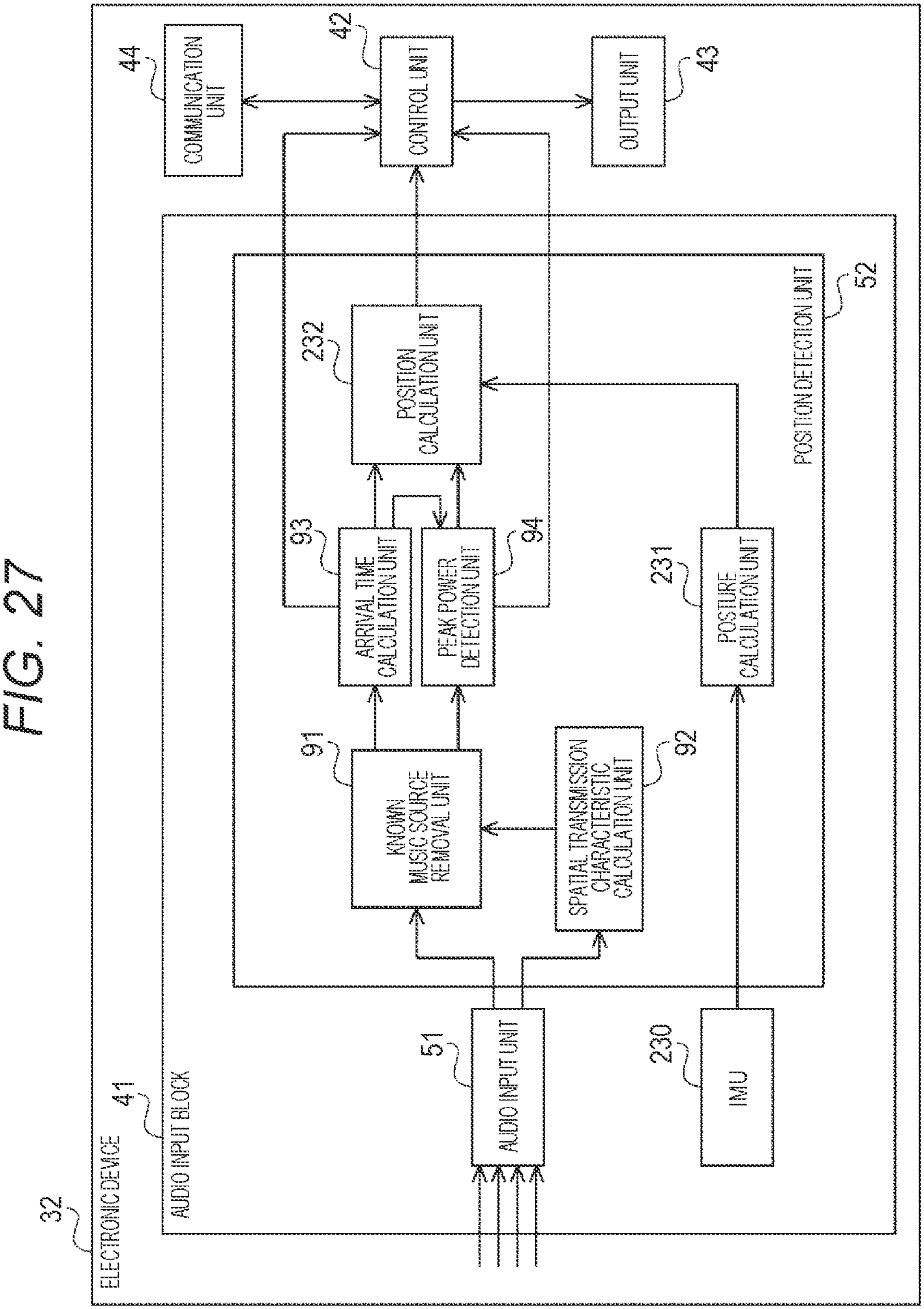
FIG. 27 is a diagram illustrating a configuration example of an electronic device in a third embodiment.

Note that in the electronic device 32 in FIG. 27, components having the same functions as those of the electronic device 32 in FIG. 3 are denoted by the same reference numerals, and the description thereof will be appropriately omitted.

The electronic device 32 of FIG. 27 is different from the electronic device 32 of FIG. 3 in that an inertial measurement unit (IMU) 230 and a posture calculation unit 231 are newly provided, and a position calculation unit 232 is provided instead of the position calculation unit 95.

The IMU 230 detects the angular velocity and the acceleration, and outputs the angular velocity and the acceleration to the posture calculation unit 231.

The posture calculation unit 231 calculates the posture of the electronic device 32 on the basis of the angular velocity and the acceleration supplied from the IMU 230, and outputs the posture to the position calculation unit 232. Note that here, since roll and pitch can always be obtained from the direction of gravity, only yaw on the xy plane is considered among roll, pitch, and yaw obtained as the posture.

The position calculation unit 232 basically has a function similar to that of the position calculation unit 95, obtains the position of the electronic device 32 in the x direction, acquires information of the posture supplied from the posture calculation unit 231 described above, obtains the angle θ formed with the audio output blocks 31-1 and 31-2 with reference to the electronic device 32 described with reference to FIG. 26, and obtains the position of the electronic device 32 in the y direction from the relational expression of the inner product.

At this time, the control unit 42 controls an output unit 43 including a speaker and a display to instruct the user to direct a predetermined part of the electronic device 32 to each of the audio output blocks 31-1 and 31-2 as necessary, and the position calculation unit 232 obtains the angle θ on the basis of the posture (direction) at that time.

Configuration Example of Position Calculation Unit in FIG. 27

Next, a configuration example of the position calculation unit 232 of the electronic device 32 in FIG. 22 will be described with reference to FIG. 28. Note that in the position calculation unit 232 in FIG. 28, components having the same functions as those of the position calculation unit 95 in FIG. 4 are denoted by the same reference numerals, and the description thereof will be appropriately omitted.

Figure 28:
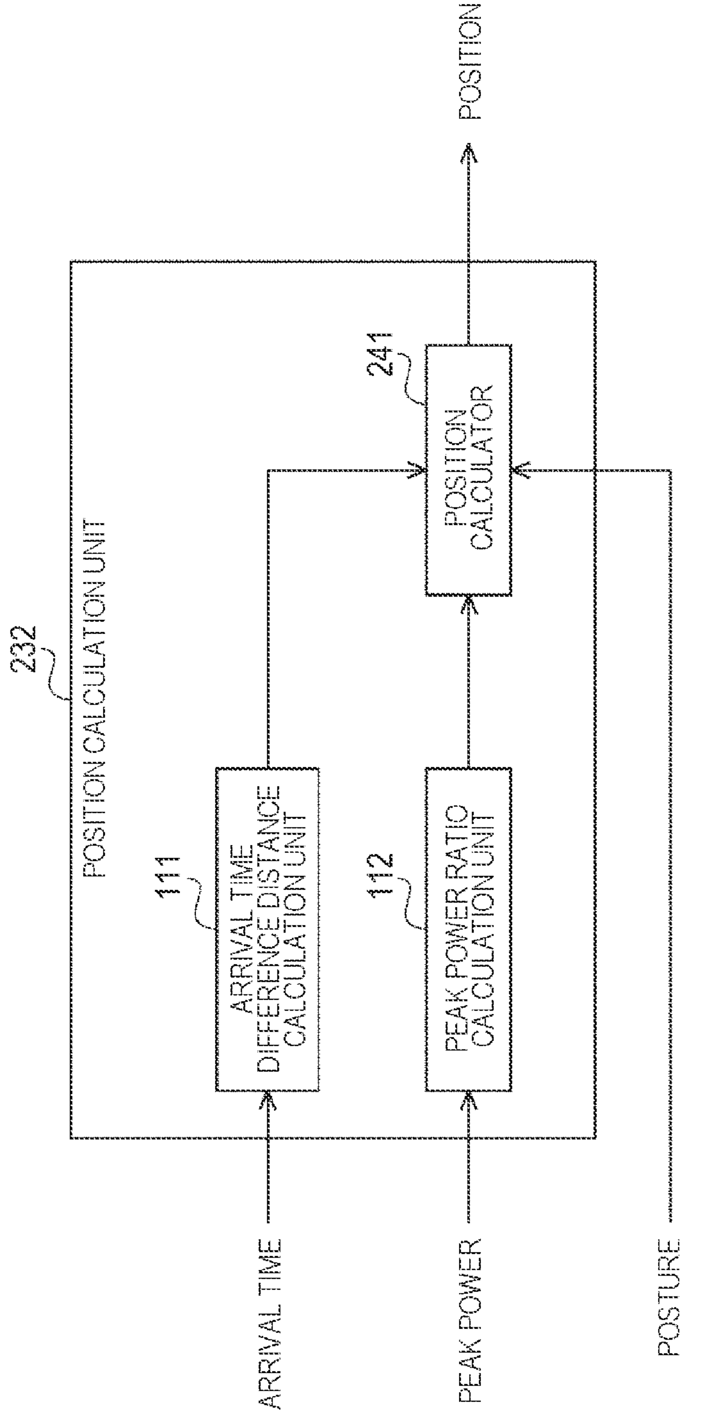
FIG. 28 is a diagram illustrating a configuration example of a position calculation unit in FIG. 27.

In the position calculation unit 232 of FIG. 28, a configuration different from that of the position calculation unit 95 of FIG. 4 is that a position calculator 241 is provided instead of the position calculator 113.

The basic function of the position calculator 241 is similar to that of the position calculator 113. The position calculator 113 functions as a hidden layer using the arrival time difference distance and the peak power ratio as input layers, and obtains the position of the electronic device 32 as an output layer.

On the other hand, the position calculator 241 adopts only the position in the x direction for the position of the electronic device 32 that is an output layer obtained using the arrival time difference distance and the peak power ratio as an input layer. Furthermore, the position calculator 241 acquires information of the posture supplied from the posture calculation unit 231, obtains the angle θ described with reference to FIG. 26, and obtains the position of the electronic device 32 in the y direction from the information of the position in the x direction and the relational expression of the inner product.

<Sound Collection Processing by Electronic Device 32 in FIG. 27>

Figure 29:
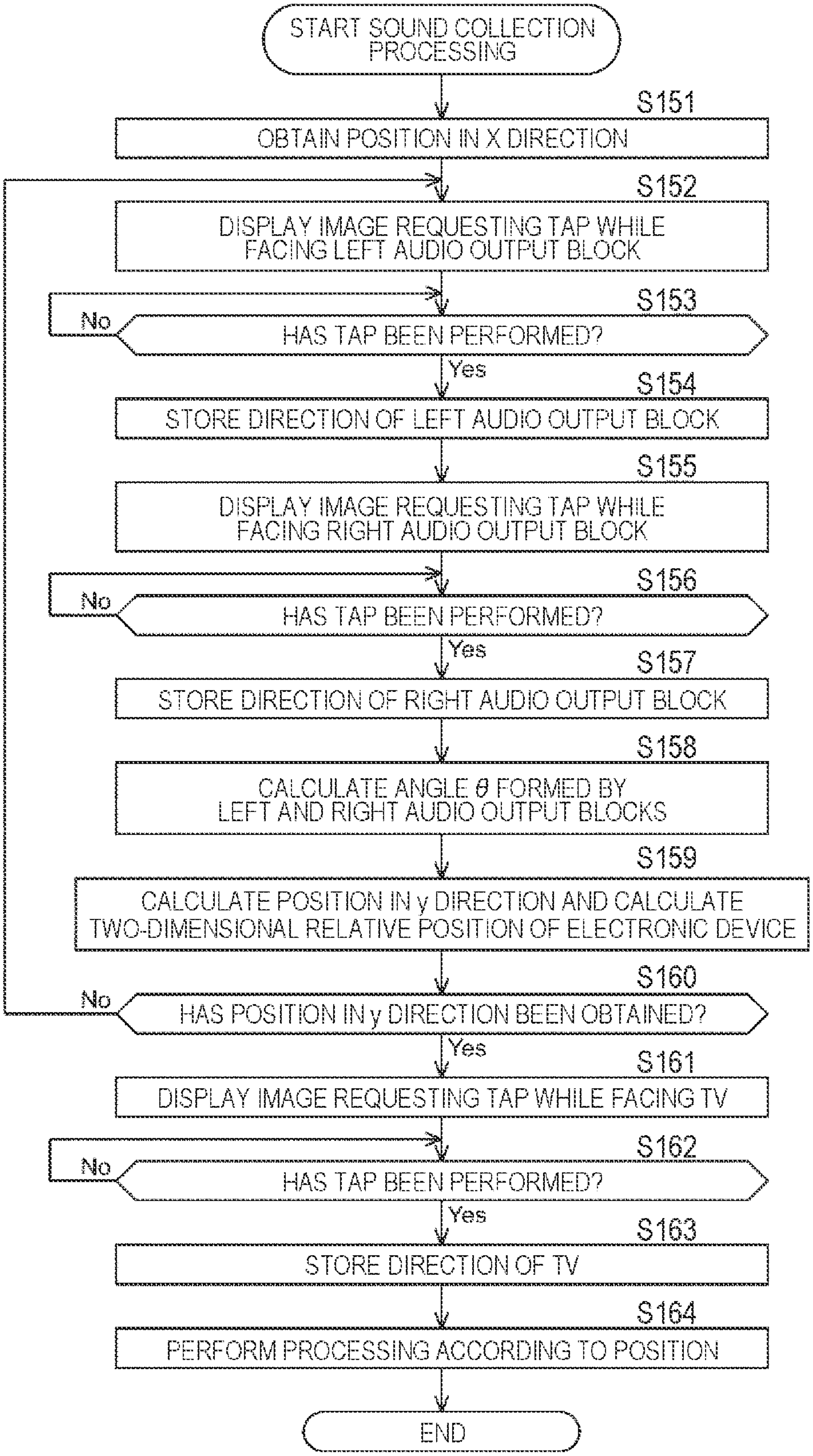
FIG. 29 is a flowchart illustrating sound collection processing by the electronic device in FIG. 27.

Next, sound collection processing by the electronic device 32 of FIG. 27 will be described with reference to a flowchart of FIG. 29. Note that the sound emission processing is similar to the processing of FIG. 16, and thus the description thereof will be omitted.

Here, the processing of step S151 in the flowchart of FIG. 25 is the processing of steps S31 to S46 in the flowchart of FIG. 17. Of the information of the position of the electronic device 32 obtained here, it is assumed that only the information of the position in the x direction is adopted, and the description thereof will be omitted. Furthermore, the audio output blocks 31-1 and 31-2 are also referred to as a left audio output block 31-1 and a right audio output block 31-2, respectively.

When the position in the x direction is obtained by the processing in step S151, in step S152, the control unit 42 controls the output unit 43 including a touch panel to display an image requesting a tap operation with the upper end part of the electronic device 32 facing the left audio output block 31-1, for example.

In step S153, the control unit 42 controls the output unit 43 to determine whether or not the tap operation has been performed, and repeats similar processing until it is determined that the tap operation has been performed.

In step S153, for example, when the user performs a tap operation with the upper end part of the electronic device 32 facing the left audio output block 31-1, it is considered that the tap operation has been performed, and the processing proceeds to step S154.

In step S154, when acquiring information of the acceleration and the angular velocity supplied from the IMU 230, the posture calculation unit 231 converts the information into posture information and outputs the posture information to the position calculation unit 232. In response to this, the position calculation unit 232 stores the posture (direction) in the state of facing the left audio output block 31-1.

In step S155, the control unit 42 controls the output unit 43 including a touch panel to display an image requesting a tap operation with the upper end part of the electronic device 32 facing the right audio output block 31-2, for example.

In step S156, the control unit 42 controls the output unit 43 to determine whether or not the tap operation has been performed, and repeats similar processing until it is determined that the tap operation has been performed.

In step S156, for example, when the user performs a tap operation with the upper end part of the electronic device 32 facing the right audio output block 31-2, it is considered that the tap operation has been performed, and the processing proceeds to step S157.

In step S157, when acquiring information of the acceleration and the angular velocity supplied from the IMU 230, the posture calculation unit 231 converts the information into posture information and outputs the posture information to the position calculation unit 232. In response to this, the position calculation unit 232 stores the posture (direction) in the state of facing the right audio output block 31-2.

In step S158, the position calculator 241 of the position calculation unit 232 calculates the angle θ formed by the left and right audio output blocks 31-1 and 31-2 with reference to the electronic device 32 from the stored information on the posture (direction) in the state of facing each of the audio output blocks 31-1 and 31-2.

In step S159, the position calculator 241 calculates the position of the electronic device 32 in the y direction from the relational expression of the inner product on the basis of the known positions of the audio output blocks 31-1 and 31-2, the position of the electronic device 32 in the x direction, and the angle θ formed by the left and right audio output blocks 31-1 and 31-2 with reference to the electronic device 32.

In step S160, the position calculator 241 determines whether or not the position in the y direction has been appropriately obtained on the basis of whether or not the obtained value of the position in the y direction of the electronic device 32 is an extremely large value, an extremely small value, or the like, such as larger or smaller than a predetermined value.

In a case where it is determined in step S160 that the position in the y direction is not appropriately obtained, the processing returns to step S152.

That is, the processing of steps S152 to S160 is repeated until the position of the electronic device 32 in the y direction is appropriately obtained.

Then, in a case where it is determined in step S160 that the position in the y direction has been appropriately obtained, the processing proceeds to step S161.

In step S161, the control unit 42 controls the output unit 43 including a touch panel to display an image requesting a tap operation with the upper end part of the electronic device 32 facing the TV 30, for example.

In step S162, the control unit 42 controls the output unit 43 to determine whether or not the tap operation has been performed, and repeats similar processing until it is determined that the tap operation has been performed.

In step S162, for example, when the user performs a tap operation with the upper end part of the electronic device 32 facing the TV 30, it is considered that the tap operation has been performed, and the processing proceeds to step S163.

In step S163, when acquiring information of the acceleration and the angular velocity supplied from the IMU 230, the posture calculation unit 231 converts the information into posture information and outputs the posture information to the position calculation unit 232. In response to this, position calculation unit 232 stores the posture (direction) in the state of facing the TV 30.

In step S164, the control unit 42 executes processing based on the obtained position of the electronic device 32, the posture (direction) of the TV 30 from the electronic device 32, and the known positions of the audio output blocks 31-1 and 31-2, and ends the processing.

For example, the control unit 42 controls the communication unit 44 to transmit a command for controlling the level and timing of the sound output from the audio output unit 74 of the audio output blocks 31-1 and 31-2 to the audio output blocks 31-1 and 31-2, so that an appropriate sound field based on the obtained position of the electronic device 32, the obtained direction of the TV 30, and the known positions of the audio output blocks 31-1 and 31-2 can be achieved.

With the above processing, the IMU is provided in the electronic device 32, the posture when the electronic device 32 is tilted toward each of the audio output blocks 31-1 and 31-2 is detected, and the angle θ between the audio output blocks 31-1 and 31-2 with respect to the electronic device 32 is obtained, so that the position in the y direction can be obtained with high accuracy from the relational expression of the inner product. As a result, the position of the electronic device 32 can be measured with high accuracy by the audio output blocks 31-1 and 31-2 including two speakers and the like and the electronic device 32 (audio input block 41).

5. Application Example of Third Embodiment

Hereinabove, an example has been described in which the IMU is provided in the electronic device 32, the position in the x direction of the electronic device 32 with respect to the audio output blocks 31-1 and 31-2, which is a direction perpendicular to the audio emission direction of the audio output block 31, is obtained by the two audio output blocks 31 and the electronic device 32 with the arrival time difference distance D and the peak power ratio PR as the input layer, the posture when the electronic device 32 is tilted toward each of the audio output blocks 31-1 and 31-2 is further detected, and the angle θ formed between the audio output blocks 31-1 and 31-2 with the electronic device 32 as a reference is obtained, so that the position in the y direction is obtained from the relational expression of the inner product.

However, as long as the positional relationship and direction between the electronic device 32 and the audio output blocks 31-1 and 31-2 are known, other configurations may be used. For example, in addition to the IMU, two audio input units 51 including microphones or the like may be provided, and the positional relationship and direction between the electronic device 32 and the audio output blocks 31-1 and 31-2 may be recognized using the two microphones.

Figure 30:
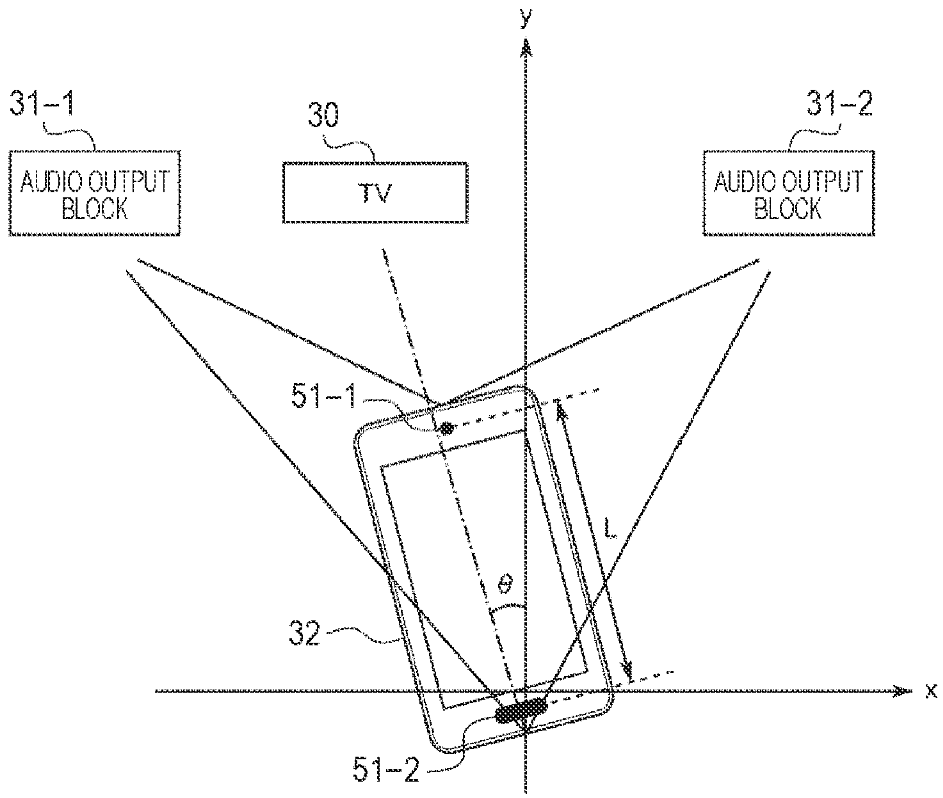
FIG. 30 is a diagram illustrating an application example of the third embodiment.

That is, as illustrated in FIG. 30, an audio input unit 51-1 may be provided in the upper end part of the electronic device 32, and an audio input unit 51-2 may be provided in the lower end part thereof.

Here, it is assumed that the audio input units 51-1 and 51-2 exist on the central position of the electronic device 32 as indicated by the alternate long and short dash line, and a distance therebetween is L. Furthermore, in this case, in the electronic device 32, it is assumed that the TV 30 exists on a straight line connecting the audio input units 51-1 and 51-2 on a center line of the electronic device 32 indicated by the alternate long and short dash line in FIG. 30, and an angle θ is formed with respect to the audio emission direction of the audio output blocks 31-1 and 31-2.

Furthermore, in the case of FIG. 30, assuming that the position of the audio input unit 51-1 is expressed by (x, y), the position of the audio input unit 51-2 is expressed by (x+L sin θ, y+L cos θ).

Here, assuming that a mutual distance L between the audio input units 51-1 and 51-2 is known and the three parameters of the position (x, y) and the angle θ of (audio input unit 51-1 of) the electronic device 32 are unknown, the position (x, y) and the angle θ of (audio input unit 51-1 of) the electronic device 32 can be obtained from simultaneous equations including the arrival time distance between the audio output block 31-1 and the audio input unit 51-1, the arrival time distance between the audio output block 31-1 and the audio input unit 51-2, the arrival time distance between the audio output block 31-2 and the audio input unit 51-1, the arrival time distance between the audio output block 31-2 and the audio input unit 51-2, and the coordinates of the known positions of the audio input unit 51-1 and the audio output blocks 31-1 and 31-2.

Furthermore, in a case where the four parameters of the distance L, the position (x, y) of (audio input unit 51-1 of) the electronic device 32, and the angle θ are unknown, as described above, the position in the x direction of the electronic device 32 can be obtained as the output layer by forming the input layer with the arrival time difference distance D and the peak power ratio PR, and performing processing with the hidden layer including the neural network formed by machine learning.

Furthermore, since the position of the audio input unit 51-1 of the electronic device 32 in the x direction is known, the unknown distance L, the position of (audio input unit 51-1 of) the electronic device 32 in the y direction, and the angle θ can be obtained from simultaneous equations including the above-described arrival time distance between the audio output block 31-1 and the audio input unit 51-1, the arrival time distance between the audio output block 31-1 and the audio input unit 51-2, the arrival time distance between the audio output block 31-2 and the audio input unit 51-1, the arrival time distance between the audio output block 31-2 and the audio input unit 51-2, the position of the audio input unit 51-1 in the x direction, and the coordinates of the known positions of the audio output blocks 31-1 and 31-2.

That is, as illustrated in FIG. 30, in a case where the two audio input units 51-1 and 51-2 are provided, when the distance L is known and the three parameters of the position (x, y) and the angle θ of (audio input unit 51-1 of) the electronic device 32 are unknown, it is possible to obtain an unknown parameter by an analytical method using simultaneous equations.

On the other hand, when the four parameters of the distance L, the position (x, y) of (audio input unit 51-1 of) the electronic device 32, and the angle θ are unknown, the position in the x direction can be obtained by a method using a neural network formed by machine learning, and then the remaining parameters can be obtained by an analytical method using simultaneous equations.

As a result, regardless of whether or not the distance L is known, in various types of electronic devices 32, the two-dimensional position of the electronic device 32 (audio input block 41) can be obtained by two speakers (audio output blocks 31-1 and 31-2) and one electronic device 32 (audio input block 41), and appropriate sound field setting can be achieved.

6. Example of Execution by Software

Incidentally, the series of processing described above can be executed by hardware, but can also be executed by software. In a case where the series of processing is executed by software, a program constituting the software is installed from a recording medium into, for example, a computer built into dedicated hardware or a general-purpose computer that is capable of executing various functions by installing various programs, or the like.

Figure 31:
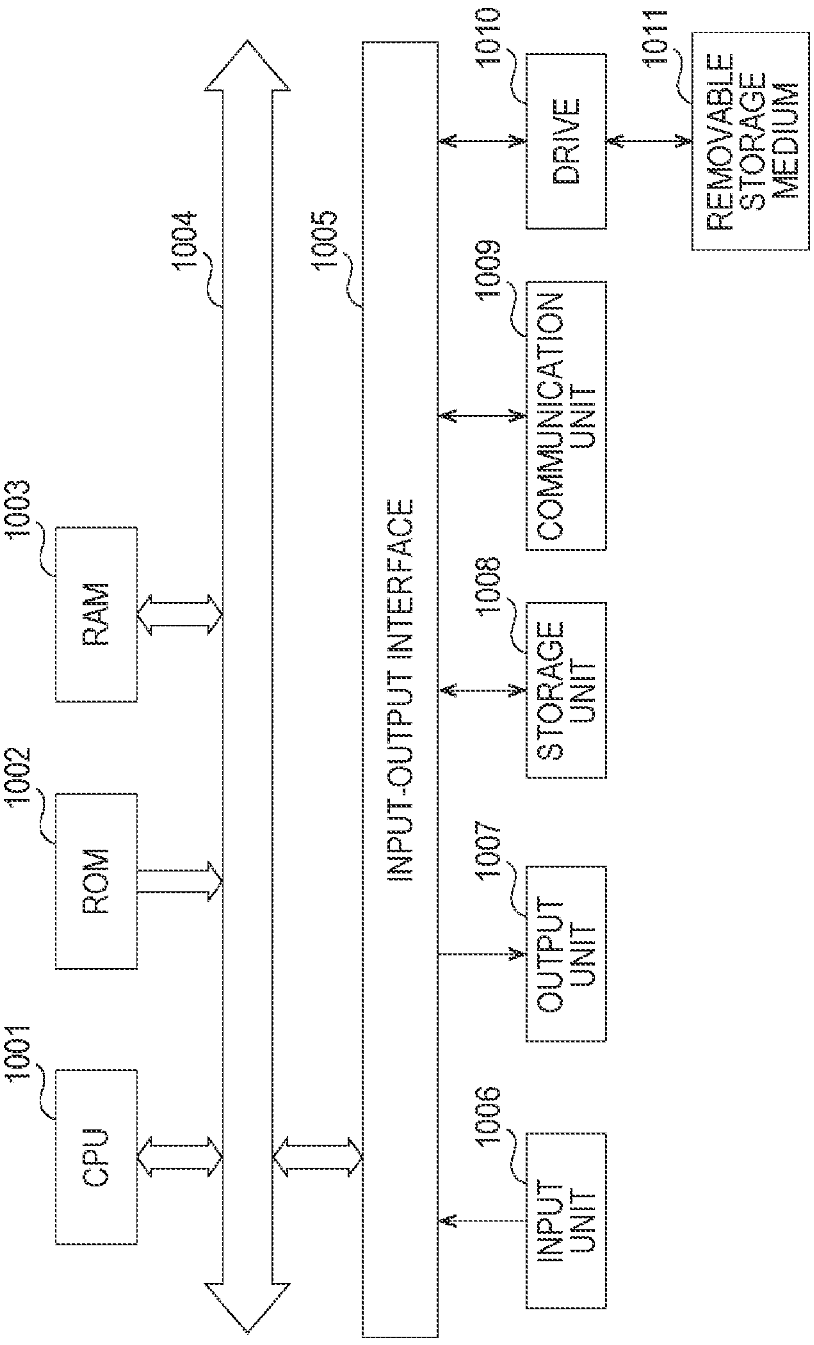
FIG. 31 illustrates a configuration example of a general-purpose computer.

FIG. 31 illustrates a configuration example of a general-purpose computer. This computer includes a central processing unit (CPU) 1001. An input-output interface 1005 is connected to the CPU 1001 via a bus 1004. A read only memory (ROM) 1002 and a random access memory (RAM) 1003 are connected to the bus 1004.

To the input-output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and executes communication processing via a network represented by the Internet are connected. Furthermore, a drive 1010 that reads and writes data from and to a removable storage medium 1011 such as a magnetic disk (including flexible disk), an optical disk (including compact disc-read only memory (CD-ROM) and digital versatile disc (DVD)), a magneto-optical disk (including MiniDisc (MD)), or a semiconductor memory is connected.

The CPU 1001 executes various processing in accordance with a program stored in the ROM 1002, or a program read from the removable storage medium 1011 such as a magnetic disk, an optical disk, a magneto-optical disk, or a semiconductor memory, installed in the storage unit 1008, and loaded from the storage unit 1008 into the RAM 1003. The RAM 1003 also appropriately stores data necessary for the CPU 1001 to execute various processing, and the like.

In the computer configured as described above, for example, the CPU 1001 loads the program stored in the storage unit 1008 into the RAM 1003 via the input-output interface 1005 and the bus 1004 and executes the program, to thereby perform the above-described series of processing.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable storage medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by a computer may be a program that is processed in time series in the order described in the present specification or a program that is processed in parallel or at necessary timings such as when it is called.

Note that the CPU 1001 in FIG. 31 implements the functions of the audio output block 31 and the audio input block 41 in FIG. 1.

Furthermore, in the present specification, a system is intended to mean assembly of a plurality of components (devices, modules (parts), and the like) and it does not matter whether or not all the components are in the same casing. Therefore, a plurality of devices housed in separate casings and connected via a network and one device in which a plurality of modules is housed in one casing are both systems.

Note that embodiments of the present disclosure are not limited to the above-described embodiments, and various modifications are possible without departing from the scope of the present disclosure.

For example, the present disclosure can have a configuration of cloud computing in which one function is shared by a plurality of devices via a network and processing is performed in cooperation.

Furthermore, each step described in the above-described flowchart can be executed by one device or be executed in a shared manner by a plurality of devices.

Moreover, in a case where a plurality of processing is included in one step, the plurality of processing included in one step can be performed by one device or be performed in a shared manner by a plurality of devices.

Note that the present disclosure can also have the following configurations.

<1> An information processing device including an audio reception unit that receives an audio signal including a spreading code signal obtained by performing spread spectrum modulation on a spreading code, the audio signal being output from two audio output blocks existing at known positions, and a position calculation unit that calculates a position of the audio reception unit on the basis of an arrival time difference distance that is a difference between distances identified from an arrival time that is a time until the audio signals of the two audio output blocks arrive at the audio reception unit and are received.

<2> The information processing device according to <1> further including an arrival time calculation unit that calculates an arrival time until each of the audio signals of the two audio output blocks arrives at the audio reception unit, and an arrival time difference distance calculation unit that calculates, as the arrival time difference distance, a difference in distance between each of the two audio output blocks and the arrival time difference distance calculation unit on the basis of an arrival time of each of the audio signals of the two audio output blocks and a known position of the two audio output blocks, in which the position calculation unit calculates a position of the audio reception unit as an output layer by performing processing using a hidden layer including a neural network formed by machine learning on an input layer including the arrival time difference distance.

<3> The information processing device according to <2>, in which:

the arrival time calculation unit includes a cross-correlation calculation unit that calculates a cross-correlation between a spreading code signal in the audio signal received by the audio reception unit and a spreading code signal of the audio signal output from the two audio output blocks, and a peak detection unit that detects a time at which a peak occurs in the cross-correlation as the arrival time; and the arrival time difference distance calculation unit calculates, as the arrival time difference distance, a difference in distance between the two audio output blocks and the arrival time difference distance calculation unit based on the arrival time detected by the peak detection unit.

<4> The information processing device according to <3>, in which the position calculation unit calculates the position of the audio reception unit as an output layer by performing processing using a hidden layer including the neural network formed by machine learning on an input layer including the arrival time difference distance and a peak power ratio that is a ratio of power at a timing at which a peak occurs in the cross-correlation of audio signals output from the two audio output blocks.

<5> The information processing device according to <4> further including a peak power detection unit that detects, as peak power, power at a time when an audio signal output from each of the two audio output blocks at the peak is received by the audio reception unit, and a peak power ratio calculation unit that calculates, as a peak power ratio, a ratio of peak powers of the audio signals output from the two audio output blocks, the peak power being detected by the peak power detection unit.

<6> The information processing device according to <5>, in which the position calculation unit calculates the position of the audio reception unit as the output layer by performing processing using the hidden layer on an input layer including the arrival time difference distance calculated by the arrival time difference distance calculation unit and the peak power ratio calculated by the peak power ratio calculation unit.

<7> The information processing device according to <4>, in which the position calculation unit calculates the position of the audio reception unit as an output layer by performing processing using a hidden layer including the neural network formed by machine learning on an input layer including the arrival time difference distance, the peak power ratio of audio signals output from the two audio output blocks, and a peak power frequency component ratio that is a ratio of a peak power of a low-frequency component to a peak power of a high-frequency component of an audio signal output from each of the two audio output blocks.

<8> The information processing device according to <7> further including a peak power frequency component ratio calculation unit that detects the peak power of a low-frequency component and the peak power of a high-frequency component of an audio signal output from each of the two audio output blocks at the peak, and calculates a ratio of the peak power of the high-frequency component to the peak power of the low-frequency component as the peak power frequency component ratio.

<9> The information processing device according to <2>, in which the position calculation unit calculates a position of the audio output block of the audio reception unit in a direction perpendicular to an audio emission direction of the audio signal by the machine learning on the basis of an arrival time difference distance of the audio signals of the two audio output blocks received by the audio reception unit, and calculates a position of the audio output block of the audio reception unit in the audio emission direction of the audio signal on the basis of an angle formed by directions of the two audio output blocks with reference to the audio reception unit.

<10> The information processing device according to <9> further including an inertial measurement unit (IMU) that detects angular velocity and acceleration of the audio reception unit, and a posture detection unit that detects a posture of the information processing device on the basis of the angular velocity and the acceleration, in which the position calculation unit calculates an angle formed by directions of the two audio output blocks with reference to the audio reception unit on the basis of the posture of the information processing device detected by the posture detection unit, and calculates a position of the audio output block of the audio reception unit in the audio emission direction of the audio signal on the basis of the calculated angle formed by directions of the two audio output blocks with reference to the audio reception unit.

<11> The information processing device according to <10>, in which the position calculation unit calculates an angle formed by directions of the two audio output blocks with reference to the audio reception unit on the basis of a posture detected by the posture detection unit when the position calculation unit turns itself toward each of the two audio output blocks.

<12> The information processing device according to <11>, in which the position calculation unit calculates a position of the audio output block of the audio reception unit in the audio emission direction of the audio signal from a relational expression of an inner product on the basis of an angle formed by directions of the two audio output blocks with reference to the audio reception unit.

<13> The information processing device according to <2> further including another audio reception unit different from the audio reception unit, in which the position calculation unit calculates a position of the audio output block of the audio reception unit in a direction perpendicular to an audio emission direction of the audio signal by machine learning on the basis of an arrival time difference distance of the audio signals of the two audio output blocks received by the audio reception unit, and forms simultaneous equations on the basis of the arrival time difference distance of the audio signals of the two audio output blocks received by the audio reception unit and the another audio reception unit, and solves the simultaneous equations to calculate a position of the audio output block of the audio reception unit in the audio emission direction of the audio signal, an angle formed by directions connecting the audio reception unit and the another audio reception unit with respect to the audio emission direction of the audio signal of the audio output block, and a distance between the audio reception unit and the another audio reception unit.

<14> The information processing device according to <2> further including another audio reception unit different from the audio reception unit, in which in a case where a distance between the audio reception unit and the another audio reception unit is known, the position calculation unit forms simultaneous equations on the basis of an arrival time difference distance of the audio signals of the two audio output blocks, information on a known position of the audio output block, and a known distance between the audio reception unit and the another audio reception unit that are received by the audio reception unit and the another audio reception unit, and solves the simultaneous equations to calculate a two-dimensional position of the audio reception unit and an angle formed by a direction connecting the audio reception unit and the other audio reception unit with respect to an audio emission direction of the audio signal of the audio output block.

<15> The information processing device according to any one of <1> to <14>, in which the information processing device is a smartphone or a head mounted display (HMD).

<16> An information processing method of an information processing device including an audio reception unit that receives an audio signal including a spreading code signal obtained by performing spread spectrum modulation on a spreading code, the audio signal being output from two audio output blocks existing at known positions, the method including a step of calculating a position of the audio reception unit on the basis of an arrival time difference distance that is a difference between distances identified from an arrival time that is a time until the audio signals of the two audio output blocks arrive at the audio reception unit and are received.

<17> A program for causing a computer to function as an audio reception unit that receives an audio signal including a spreading code signal obtained by performing spread spectrum modulation on a spreading code, the audio signal being output from two audio output blocks existing at known positions, and a position calculation unit that calculates a position of the audio reception unit on the basis of an arrival time difference distance that is a difference between distances identified from an arrival time that is a time until the audio signals of the two audio output blocks arrive at the audio reception unit and are received.

REFERENCE SIGNS LIST

11 Home audio system
31, 31-1, 31-2 Audio output block
32 Electronic device
41 Audio input block
42 Control unit
43 Output unit
44 Communication unit
51, 51-1, 51-2 Audio input unit
71 Spreading code generation unit
72 Known music source generation unit
73 Audio generation unit
74 Audio output unit
81 Spreading unit
82 Frequency shift processing unit
83 Sound field control unit
91 Known music source removal unit
92 Spatial transmission characteristic calculation unit
93 Arrival time calculation unit
94 Peak power detection unit
95 Position calculation unit
111 Arrival time difference distance calculation unit
112 Peak power ratio calculation unit
113 Position calculation unit
130 Inverse shift processing unit
131 Cross-correlation calculation unit
132 Peak detection unit
201 Peak power frequency component ratio calculation unit
202 Position calculation unit
211 Position calculation unit
230 IMU
231 Posture calculation unit
232 Position calculation unit
241 Position calculation unit

The invention claimed is:

1. An information processing device comprising circuitry configured to receive, by a microphone, an audio signal including a spreading code signal obtained by performing spread spectrum modulation on a spreading code, the audio signal being output from two speakers existing at known positions, calculate a position of the microphone on a basis of an arrival time difference distance that is a difference between distances identified from an arrival time that is a time until the audio signals of the two speakers arrive at the microphone and are received, and calculate a position of the microphone as an output layer by performing processing using a hidden layer including a neural network formed by machine learning on an input layer including the arrival time difference distance.

2. The information processing device according to claim 1, wherein the circuitry is further configured to calculate an arrival time until each of the audio signals of the two speakers arrives at the microphone, and calculate, as the arrival time difference distance, a difference in distance between each of the two speakers and the microphone on a basis of an arrival time of each of the audio signals of the two speakers and a known position of the two speakers.

3. The information processing device according to claim 2, wherein the circuitry is further configured to calculate a cross-correlation between a spreading code signal in the audio signal received by the microphone and a spreading code signal of the audio signals output from the two speakers, detect a time at which a peak occurs in the cross-correlation as the arrival time, and calculate, as the arrival time difference distance, a difference in distance between the two speakers and the microphone based on the arrival time.

4. The information processing device according to claim 3, wherein the circuitry is further configured to calculate the position of the microphone as an output layer by performing processing using a hidden layer including the neural network formed by machine learning on an input layer including the arrival time difference distance and a peak power ratio that is a ratio of power at a timing at which a peak occurs in the cross-correlation of audio signals output from the two speakers.

5. The information processing device according to claim 4, wherein the circuitry is further configured to detect, as peak power, power at a time when an audio signal output from each of the two speakers at the peak is received by the microphone, and calculate, as a peak power ratio, a ratio of peak powers of the audio signals output from the two speakers, the peak power being detected by the circuitry.

6. The information processing device according to claim 5, wherein the circuitry is further configured to calculate the position of the microphone as the output layer by performing processing using the hidden layer on an input layer including the arrival time difference distance and the peak power ratio.

7. The information processing device according to claim 4, wherein the circuitry is further configured to calculate the position of the microphone as an output layer by performing processing using a hidden layer including the neural network formed by machine learning on an input layer including the arrival time difference distance, the peak power ratio of audio signals output from the two speakers, and a peak power frequency component ratio that is a ratio of a peak power of a low-frequency component to a peak power of a high-frequency component of an audio signal output from each of the two speakers.

8. The information processing device according to claim 7, wherein the circuitry is further configured to detect the peak power of a low-frequency component and the peak power of a high-frequency component of an audio signal output from each of the two speakers at the peak, and calculate a ratio of the peak power of the high-frequency component to the peak power of the low-frequency component as the peak power frequency component ratio.

9. The information processing device according to claim 2, wherein the circuitry is further configured to calculate a position of the speaker of the microphone in a direction perpendicular to an audio emission direction of the audio signal by the machine learning on a basis of an arrival time difference distance of the audio signals of the two speakers received by the microphone, and calculate a position of the speaker of the microphone in the audio emission direction of the audio signal on a basis of an angle formed by directions of the two speakers with reference to the microphone.

10. The information processing device according to claim 9, wherein the circuitry is further configured to detect angular velocity and acceleration of the microphone, detect a posture of the information processing device on a basis of the angular velocity and the acceleration, calculate an angle formed by directions of the two speakers with reference to the microphone on a basis of the posture of the information processing device, and calculate a position of the speaker of the microphone in the audio emission direction of the audio signal on a basis of the calculated angle formed by directions of the two speakers with reference to the microphone.

11. The information processing device according to claim 10, wherein the circuitry is further configured to calculate an angle formed by directions of the two speakers with reference to the microphone on a basis of a posture when the microphone turns itself toward each of the two speakers.

12. The information processing device according to claim 11, wherein the circuitry is further configured to calculate a position of the speaker of the microphone in the audio emission direction of the audio signal from a relational expression of an inner product on a basis of an angle formed by directions of the two speakers with reference to the microphone.

13. The information processing device according to claim 2, further comprising another microphone different from the microphone, wherein the circuitry is further configured to calculate a position of the speaker of the microphone in a direction perpendicular to an audio emission direction of the audio signal by machine learning on a basis of an arrival time difference distance of the audio signals of the two speakers received by the microphone, and form simultaneous equations on a basis of the arrival time difference distance of the audio signals of the two speakers received by the microphone and the another microphone, and solve the simultaneous equations to calculate a position of the speaker of the microphone in the audio emission direction of the audio signal, an angle formed by directions connecting the microphone and the another microphone with respect to the audio emission direction of the audio signal of the speaker, and a distance between the microphone and the another microphone.

14. The information processing device according to claim 2, further comprising another microphone different from the microphone, wherein in a case where a distance between the microphone and the another microphone is known, the circuitry is further configured to form simultaneous equations on a basis of an arrival time difference distance of the audio signals of the two speakers, information on a known position of the speaker, and a known distance between the microphone and the another microphone that are received by the microphone and the another microphone, and solve the simultaneous equations to calculate a two-dimensional position of the microphone and an angle formed by a direction connecting the microphone and the another microphone with respect to an audio emission direction of the audio signal of the speaker.

15. The information processing device according to claim 1, wherein the information processing device is a smartphone or a head mounted display (HMD).

16. An information processing method comprising receiving, by a microphone, an audio signal including a spreading code signal obtained by performing spread spectrum modulation on a spreading code, the audio signal being output from two speakers existing at known positions, calculating a position of the microphone on a basis of an arrival time difference distance that is a difference between distances identified from an arrival time that is a time until the audio signals of the two speakers arrive at the microphone and are received, and calculating a position of the microphone as an output layer by performing processing using a hidden layer including a neural network formed by machine learning on an input layer including the arrival time difference distance.

17. A non-transitory computer-readable medium having embodied thereon a program, which when executed by a computer causes the computer to execute an information processing method, the method comprising receiving, by a microphone, an audio signal including a spreading code signal obtained by performing spread spectrum modulation on a spreading code, the audio signal being output from two speakers existing at known positions, calculating a position of the microphone on a basis of an arrival time difference distance that is a difference between distances identified from an arrival time that is a time until the audio signals of the two speakers arrive at the microphone and are received, and calculating a position of the microphone as an output layer by performing processing using a hidden layer including a neural network formed by machine learning on an input layer including the arrival time difference distance.

* * * * *